US009068374B2

(12) United States Patent
Jayadevappa et al.

(10) Patent No.: US 9,068,374 B2
(45) Date of Patent: Jun. 30, 2015

(54) VEHICLE MANAGEMENT SYSTEM

(75) Inventors: Suryaprasad Jayadevappa, Bangalore (IN); Haseeb Arfath Syed, Bangalore (IN); Srinidhi Sridhar, Bangalore (IN)

(73) Assignee: PES School Of Engineering, Bangalore, Karnataka (IN)

( * ) Notice: Subject to any disclaimer, the term of this patent is extended or adjusted under 35 U.S.C. 154(b) by 1051 days.

(21) Appl. No.: 13/009,853

(22) Filed: Jan. 20, 2011

(65) Prior Publication Data
US 2012/0143401 A1    Jun. 7, 2012

(30) Foreign Application Priority Data
Dec. 6, 2010  (IN) ............................. 3669/CHE/2010

(51) Int. Cl.
| G05D 1/00 | (2006.01) |
| E05B 47/00 | (2006.01) |
| B62H 3/00 | (2006.01) |
| E05B 47/02 | (2006.01) |
| G07C 9/00 | (2006.01) |
| E05B 17/22 | (2006.01) |

(52) U.S. Cl.
CPC .............. E05B 47/0012 (2013.01); B62H 3/00 (2013.01); E05B 17/22 (2013.01); E05B 47/004 (2013.01); E05B 47/026 (2013.01); G07C 9/00174 (2013.01)

(58) Field of Classification Search
USPC ........................................................ 701/519
IPC .... E05B 17/22,47/0012, 47/026, 47/004; B62H 3/00; G07C 9/00174
See application file for complete search history.

(56) References Cited

U.S. PATENT DOCUMENTS

| 5,532,690 | A | * | 7/1996 | Hertel | ............................ | 340/989 |
| 6,313,791 | B1 | * | 11/2001 | Klanke | .................... | 342/357.75 |
| 6,457,129 | B2 | * | 9/2002 | O'Mahony | ........................ | 726/4 |
| 7,873,455 | B2 | * | 1/2011 | Arshad et al. | ................... | 701/50 |
| 2006/0206261 | A1 | | 9/2006 | Altaf et al. | | |
| 2006/0265128 | A1 | | 11/2006 | Miller | | |
| 2007/0288307 | A1 | * | 12/2007 | Mathews et al. | ................. | 705/13 |
| 2008/0034820 | A1 | * | 2/2008 | Gagosz et al. | ................... | 70/235 |

(Continued)

FOREIGN PATENT DOCUMENTS

| WO | WO2008157443 A2 | 12/2008 |
| WO | WO201068438 A2 | 6/2010 |

Primary Examiner — Stefanos Karmis
Assistant Examiner — Michael E Butler
(74) Attorney, Agent, or Firm — Ash Tankha; Lipton, Weinberger & Husick

(57) ABSTRACT

A method and system for managing vehicles within a boundary is provided. Boundary units positioned at predetermined locations in a managing area define a boundary, within which multiple docking stations that secure the vehicles are positioned. Each docking station comprises a client component and a locking unit. The client component, in communication with a central server, allocates a vehicle to a user based on allocation criteria. The locking unit unlocks the allocated vehicle from a docking station. Each vehicle comprises a vehicle control unit, in communication with the boundary units, for determining proximity of the allocated vehicle to the defined boundary, and for restricting movement of the allocated vehicle when the allocated vehicle is in close proximity to the defined boundary. The central server, in communication with the boundary units, determines location of the allocated vehicle, when the allocated vehicle is in close proximity to and breaches the defined boundary.

12 Claims, 23 Drawing Sheets

(56) References Cited

U.S. PATENT DOCUMENTS

| | | |
|---|---|---|
| 2008/0077299 A1 | 3/2008 | Arshad et al. |
| 2009/0315767 A1* | 12/2009 | Scalisi et al. ............. 342/357.07 |
| 2010/0228405 A1* | 9/2010 | Morgal et al. ..................... 701/2 |
| 2010/0245128 A1* | 9/2010 | Kanof ........................ 340/932.2 |
| 2011/0161141 A1* | 6/2011 | Bettez et al. .................... 705/13 |
| 2011/0226708 A1* | 9/2011 | Mercat et al. ..................... 211/5 |
| 2011/0307394 A1* | 12/2011 | Rzepecki ..................... 705/307 |
| 2013/0268448 A1* | 10/2013 | Kanof .......................... 705/307 |

\* cited by examiner

VEHICLE MANAGEMENT SYSTEM

CROSS REFERENCE TO RELATED APPLICATIONS

This application claims the benefit of non-provisional patent application number 3669/CHE/2010 titled "Vehicle Management System", filed on Dec. 6, 2010 in the Indian Patent Office.

The specification of the above referenced patent application is incorporated herein by reference in its entirety.

BACKGROUND

The issue of global warming is often in the news and is now of critical importance. Global warming refers to an increase in average global temperatures. The increase in average global temperatures is caused primarily due to an increase in greenhouse gases such as carbon dioxide, methane, nitrous oxide, etc. Of these gases, carbon dioxide is a major contributor to global warming. Burning fossil fuel in transportation vehicles is one of the reasons for the increase in atmospheric concentrations of greenhouse gases. To mitigate global warming, there is a need for an increased use of eco-friendly vehicles, for example, bicycles, tricycles, etc., as a means for commute and transportation.

Since the use of such eco-friendly vehicles is not feasible for travel over long distances due to the vehicles' slow speed, inability to carry multiple passengers, and the requirement of a driver to be fit enough to pedal the eco-friendly vehicle over an extended distance, it becomes imperative to make as much use of the eco-friendly vehicles as possible for covering smaller distances, for example, within campuses. However, carrying the eco-friendly vehicles over large distances to use them over smaller distances is tedious and often not possible. Hence, there is a need for pooling eco-friendly vehicles at common parking areas that are then made available for use among users within a particular area.

The relatively small size and mass of these vehicles render these vehicles prone to theft. Although such eco-friendly vehicles are viable and environment friendly, their security is an important concern. Conventional methods of providing security within an area include erecting a physical fence along the boundary of an area and having security personnel guard the boundary area. Providing a physical fence along a boundary of an area, for example, a technological park, is not always possible where many corporate campuses share the land along with other corporate campuses. Having security personnel guard the area is inefficient, as they often take short breaks during which the area is left unguarded. Hence, there is a need for setting up a virtual boundary along the boundary of the area for preventing the eco-friendly vehicles from breaching the boundary area.

Hence, there is a long felt but unresolved need for a method and system that defines a virtual boundary around a predefined area and manages and tracks multiple vehicles within the defined boundary.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method and system disclosed herein addresses the above stated need for defining a boundary around a predefined area and managing and tracking multiple vehicles within the defined boundary. A vehicle management system is provided. The vehicle management system comprises multiple boundary units, docking stations, a vehicle control unit for each of the vehicles, and a central server. The boundary units are positioned at predetermined locations in a managing area for defining a boundary along a perimeter of the managing area. Multiple docking stations are positioned at predetermined locations within the defined boundary for parking and securing the vehicles.

The central server is in electronic communication with the boundary units, the docking stations, and the vehicle control unit of each of the vehicles in a networked environment. The central server monitors and manages the boundary units, the docking stations, and the vehicle control unit of each of the vehicles. The central server registers users, the vehicles, the docking stations, and the boundary units. The central server stores identification information of the registered users, the registered vehicles, the registered docking stations, and the registered boundary units in a database residing in the central server. The central server provides a user identifier to the user on registration of the user with the central server.

Each of the docking stations comprises a client component and a locking unit. Each of the docking stations further comprises a charging unit for charging the vehicle control unit of each of the vehicles. The client component of each of the docking stations provides a communication interface for receiving identification information from the user for authorization of the user, in communication with the central server, for allocating one of the vehicles to the user. The client component provides a communication gateway to the central server for the user at a docking station. The client component receives the identification information, for example, a user identifier, from the user via the communication interface and transmits the identification information to the central server. The central server then verifies the identification information transmitted by the client component by mapping the identification information to its own database and returns an authorization status to the client component. Thus, the client component, in communication with the central server, authorizes the user prior to the allocation of one of the vehicles to the user.

After receiving the authorization status for the user from the central server, the client component allocates one of the vehicles from its docking station to the user based on allocation criteria. The user then can take the allocated vehicle from that docking station and use the allocated vehicle for commute to another docking station within the defined boundary. The allocation criteria for allocating one of the vehicles from the docking station comprise, for example, charge level of each of the vehicles parked and secured at the docking station, user authorization, etc. The client component detects that the user has retrieved the allocated vehicle from its docking station automatically and communicates the vehicle identifier of the allocated vehicle to the central server. On receiving the vehicle identifier from the client component, the central server associates the user identifier with the vehicle identifier and stores the vehicle identifier in the database.

After authorization of the user, the client component determines the charge level of each of the vehicles in the docking station by requesting each of the vehicles to return their charge levels to the client component for selecting the vehicle with the highest charge level, or the vehicle whose charge level is above a predefined threshold when the charge levels of the parked vehicles are low, for allocation to the user. The client component then determines position and a vehicle identifier of the selected vehicle on a support structure of the docking station and communicates the determined position and the vehicle identifier to the locking unit. The client component communicates the vehicle identifier to the locking unit along with an unlock instruction. The locking unit unlocks the allocated vehicle from the docking station.

The locking unit is slidably attached on the support structure in each of the docking stations. The locking unit contacts a securing component provided on the support structure for engaging and disengaging the allocated vehicle from the docking station. The locking unit identifies and unlocks the allocated vehicle from the docking station, for example, by sliding along the support structure, scanning vehicle identifiers of the vehicles secured at the docking station, and matching the vehicle identifiers with the vehicle identifier of the allocated vehicle communicated to the locking unit by the client component. The locking unit comprises a first drive mechanism operably connected to a first opposing surface of a housing of the locking unit. The first drive mechanism of the locking unit drives the locking unit to the determined position of the allocated vehicle to enable unlocking of the allocated vehicle. The locking unit slides along the support structure to the determined position and disengages the allocated vehicle from the securing component provided on the support structure. In an embodiment, one or more inductive proximity sensors are positioned on the housing of the locking unit. The locking unit, in communication with the securing component, monitors output of the inductive proximity sensors to determine and track status of the vehicles at each of the docking stations based on arrival and parking of the vehicles at each of the docking stations and a lock condition of the vehicles.

The securing component comprises an elongate member with an outwardly protruding extension, and a securing socket. The securing socket is configured on a base plate rigidly attached to the elongate member. The securing socket receives a protruding element extending from each of the vehicles for securing each of the vehicles by the elongate member. The locking unit further comprises a pair of jaw members and a second drive mechanism. The pair of jaw members is defined on a handle rigidly attached to a second opposing surface of the housing of the locking unit. The pair of jaw members extends outwardly from the handle and defines a space for receiving the outwardly protruding extension of the elongate member of the securing component. The second drive mechanism of the locking unit is engageably connected to the handle for moving the handle vertically in an upward direction and a downward direction, whereby the outwardly protruding extension of the elongate member of the securing component held within the space defined by the pair of jaw members of the moved handle is moved in the upward direction and the downward direction for disengaging and engaging the protruding element extending from each of the vehicles.

The vehicle control unit of each vehicle is electromechanically connected to the vehicle. The vehicle control unit is in electronic communication with the boundary units and the client component in each of the docking stations. The vehicle control unit, in communication with the boundary units, determines proximity of the allocated vehicle to the defined boundary. The vehicle control unit sends a warning signal to the user when the allocated vehicle is in close proximity to the defined boundary. The vehicle management system manages movement of the allocated vehicle within the defined boundary. The vehicle control unit restricts movement of the allocated vehicle within the defined boundary, when the allocated vehicle is in close proximity to the defined boundary. When the user parks the allocated vehicle at one of the docking stations, the locking unit of the docking station locks the allocated vehicle.

A disabling unit is provided on each of the vehicles. The disabling unit is operably connected to the vehicle and the vehicle control unit. The disabling unit comprises a brake actuator and a lock actuator. The brake actuator is operably connected to wheels of each of the vehicles. The vehicle control unit controls the brake actuator for braking the allocated vehicle to bring the allocated vehicle to a halt. The lock actuator is operably connected to the wheels of each of the vehicles. The vehicle control unit controls the lock actuator for locking the wheels of the allocated vehicle, when the allocated vehicle attempts to breach the defined boundary. In an embodiment, the vehicle control unit communicates with the boundary units to detect auxiliary movement of the allocated vehicle after locking and disabling of the allocated vehicle by determining the change in proximity to the boundary units from the initial proximity determined at the instance when the allocated vehicle is disabled. If any change in proximity is determined, the boundary units notify the central server about a theft attempt in progress.

In an embodiment, one or more of the boundary units sends a notification to the central server regarding the breach of the defined boundary by the allocated vehicle on detection of auxiliary movement of the disabled vehicle. The central server, in communication with the boundary units, determines the location of the allocated vehicle based on the location of the notifying boundary unit, when the allocated vehicle is in close proximity to the defined boundary or breaches the defined boundary. The database of the central server logs usage statistics of the allocated vehicle in communication with each of the docking stations, the vehicle control unit, and the boundary units. The central server generates billing information for the user based on the logged usage statistics.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific components and methods disclosed herein.

DETAILED DESCRIPTION OF THE INVENTION

Figure 1A:
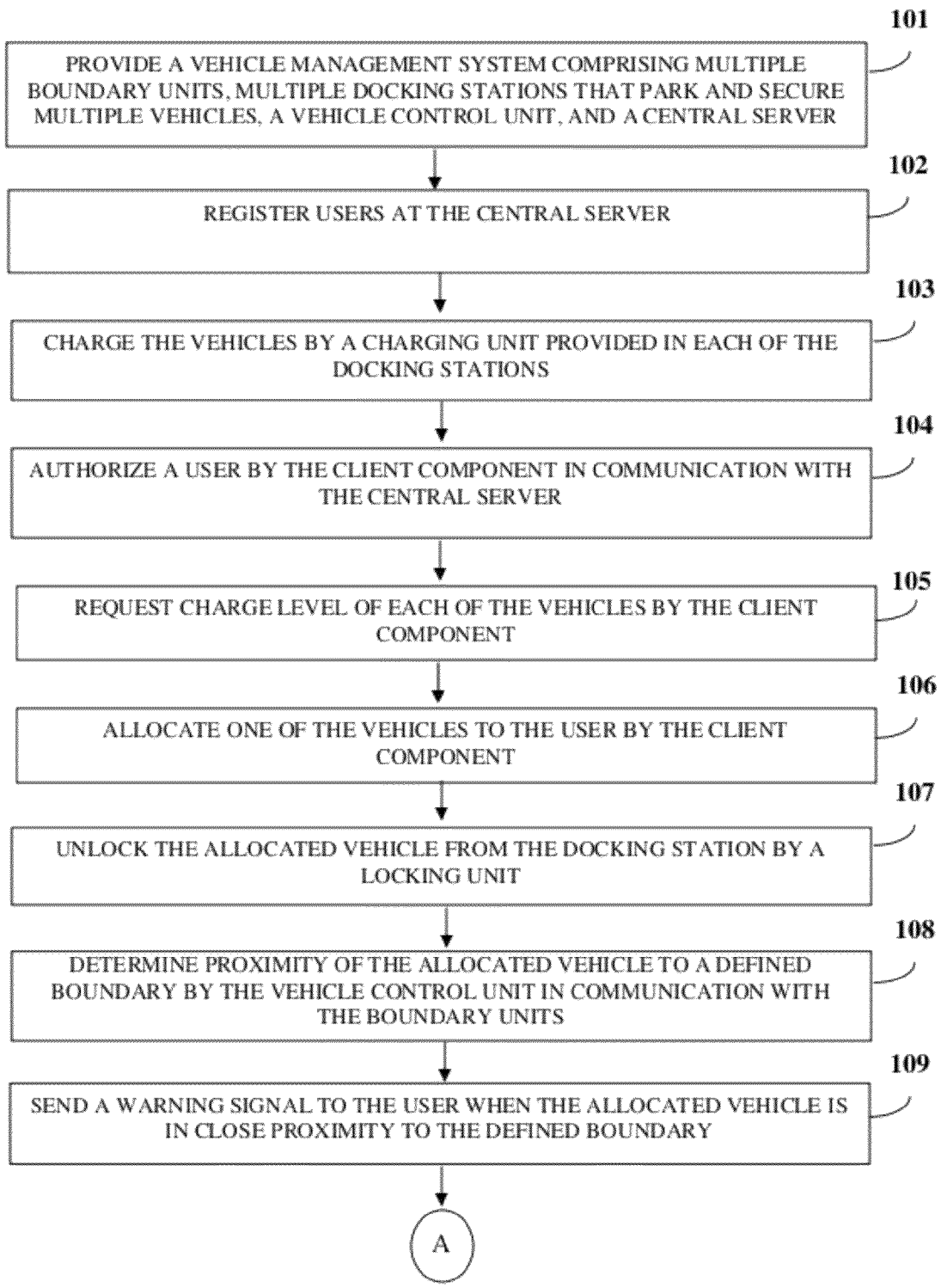
FIGS. 1A-1B illustrate a method for managing multiple vehicles within a boundary.
Figure 1B:
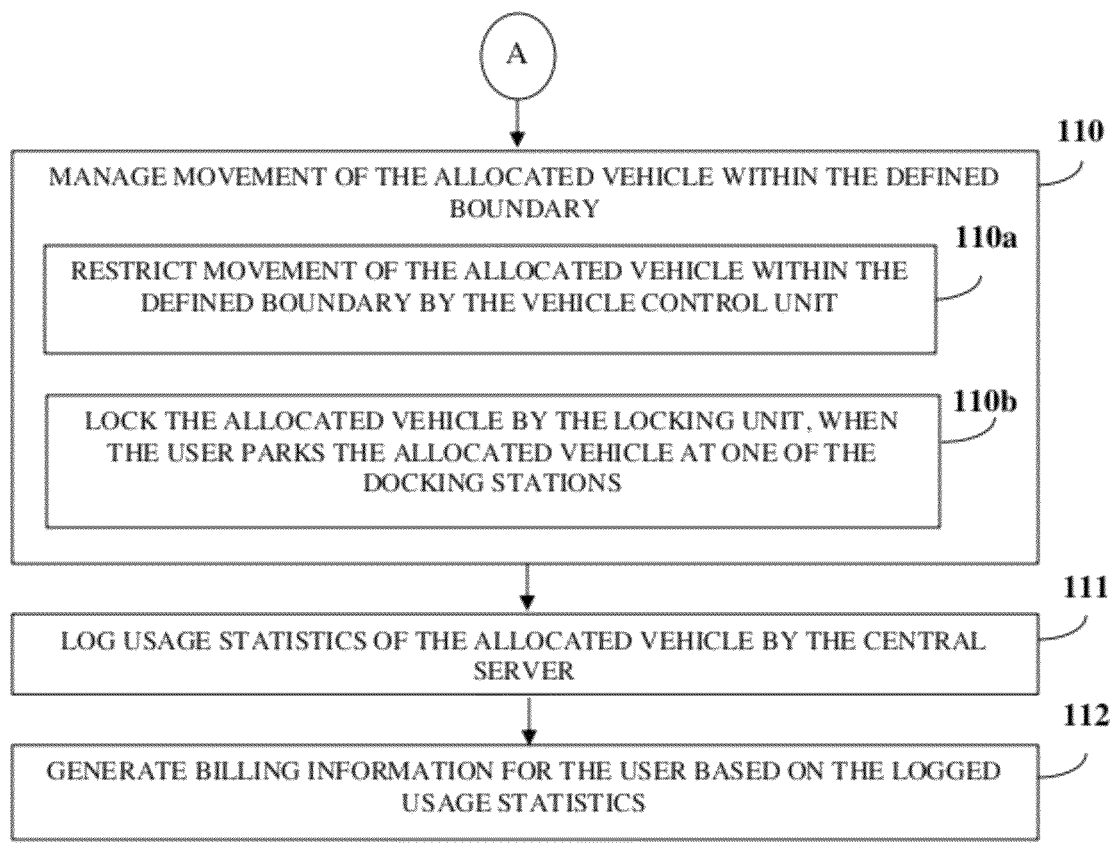

FIGS. 1A-1B illustrate a method for managing multiple vehicles within a boundary. As used herein, the term "vehicles" refers to eco-friendly vehicles, for example, bicycles, tricycles, electric carts, electric golf carts, non-polluting light vehicles, etc., that enable a user to commute within a managing area of a facility such as a campus. The method disclosed herein provides 101 a vehicle management system 200 comprising multiple boundary units 201, multiple docking stations 202, a vehicle control unit 501, and a central server 204 as exemplarily illustrated in FIG. 2 and FIG. 5. The boundary units 201 are positioned at predetermined locations in a managing area 206 for defining a boundary 205. The vehicles 203 are intended to be shared among users within the managing area 206. As used herein, the term "managing area" refers to any large area that necessitates use of the vehicles 203 for commuting from one point to another point within the area, for example, a campus, a technology park, etc. Also, as used herein, the term "boundary" refers to a virtual boundary 205 defined along a perimeter 206a of the managing area 206 by the boundary units 201 and created using radio frequency signals of the boundary units 201.

The central server 204 is in electronic communication with the boundary units 201, the docking stations 202, and the vehicle control unit 501 in a networked environment. The central server 204 monitors and manages the boundary units 201, the docking stations 202, and the vehicle control unit 501. Users who wish to use the vehicles 203 for commuting within the managing area 206 register 102 with the central server 204 by providing user identification information. The central server 204 provides a user identifier to the user on registration of the user with the central server 204.

Figure 2:
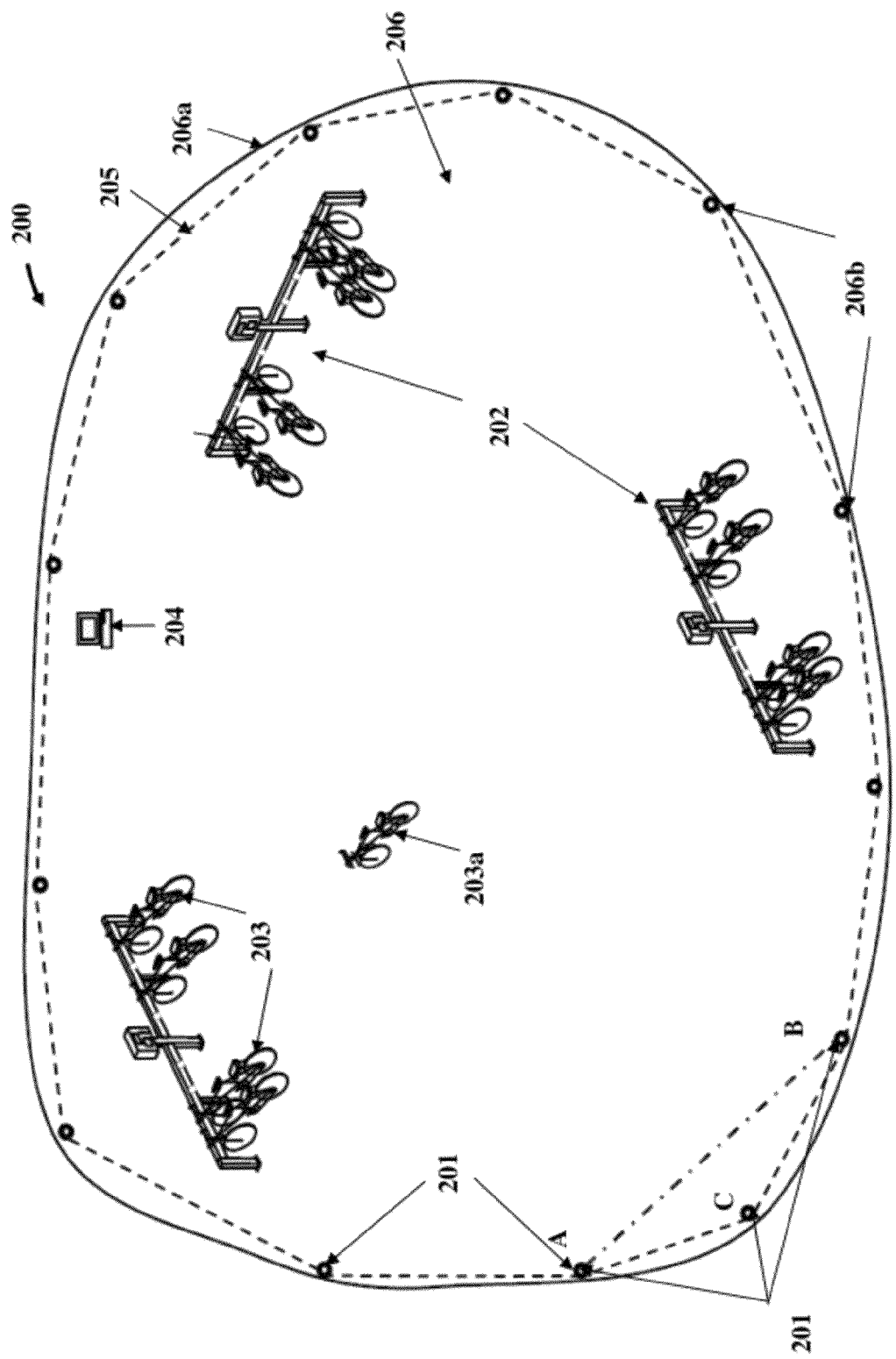
FIG. 2 exemplarily illustrates a managing area managed by a vehicle management system.

The docking stations 202 are positioned at predetermined locations within the defined boundary 205 for parking and securing the vehicles 203 as exemplarily illustrated in FIG. 2. Each of the docking stations 202 comprises a client component 503 and a locking unit 502. In an embodiment, each of the docking stations 202 further comprises a charging unit 509 for charging 103 the vehicle control unit 501 of each of the vehicles 203. The charging unit 509 is positioned, for example, below each securing component 602 on a support structure 601 of each of the docking stations 202 as exemplarily illustrated in FIG. 6. The client component 503 is an application or a computer system connected to each of the docking stations 202. In an embodiment, the client component 503 is configured as a thin client that depends on the central server 204 to perform its functions, for example, authorizing the user prior to allocation of a vehicle 203 to the user, etc. The central server 204 performs information processing on behalf of the thin client. As exemplarily illustrated in FIG. 5, the client component 503 communicates with the central server 204 via a communication network 510, for example, a WiFi communication network, a general packet radio service (GPRS) network, a mobile telecommunication network, a local area communication network, an internet connection network, a Bluetooth™ communication network, an infrared communication network, etc. A mobile telecommunication network is, for example, a global system for mobile (GSM) communication network, a code division multiple access (CDMA) network, a third generation (3G) mobile communication network, etc.

The client component 503 provides a communication interface 504 for receiving identification information, for example, the user identifier, biometric identifiers, etc., from the user for authorization of the user, in communication with the central server 204, for allocating one of the vehicles 203 to the user. The client component 503, in communication with the central server 204, authorizes 104 the user using, for example, the user identifier. The client component 503, in communication with the central server 204, allocates one of the vehicles 203 from one of the docking stations 202 to the user based on allocation criteria, for enabling the user to commute from one docking station 202 to another docking station 202 within the defined boundary 205. The allocation criteria for allocating one of the vehicles 203 from the docking station 202 comprise, for example, charge level of each of the vehicles 203 parked and secured at the docking station 202, user authorization, etc. The central server 204 associates the user identifier with a vehicle identifier of the allocated vehicle 203a.

On authorization, the client component 503 requests 105 the vehicles 203 in the docking station 202 to return their charge levels. In an example, the client component 503 allocates 106 the vehicle 203 with the highest charge level or battery life to the user. The locking unit 502 of each of the docking stations 202 is slidably attached on the support structure 601 in each of the docking stations 202. The locking unit 502 contacts a securing component 602 provided on the support structure 601 for engaging and disengaging the allocated vehicle 203a from the docking station 202 as disclosed in the detailed description of FIG. 11. The locking unit 502 identifies the allocated vehicle 203a secured at the docking station 202 by sliding along the support structure 601, scanning vehicle identifiers of the vehicles 203 secured at the docking station 202, and matching the vehicle identifiers with the vehicle identifier of the allocated vehicle 203a communicated to the locking unit 502 by the client component 503. The locking unit 502 then unlocks 107 the allocated vehicle 203a from the docking station 202 by disengaging the allocated vehicle 203a from the securing component 602 of the docking station 202. The locking unit 502, in communication with the securing component 602, determines and tracks status of the vehicles 203 at the docking station 202 based on arrival and parking of the vehicles 203 at the docking station 202 and lock condition of the vehicles 203. When the allocated vehicle 203a is unlocked, the client component 503 sends a message to the central server 204 to initiate a timer 204d for timing the usage of the allocated vehicle 203a within the defined boundary 205.

The user can use the allocated vehicle 203a only within the defined boundary 205 of the managing area 206. The vehicle control unit 501 of each of the vehicles 203 is electromechanically connected to each of the vehicles 203. The vehicle control unit 501 is in electronic communication with the boundary units 201 and the client component 503 in each of the docking stations 202. The vehicle control unit 501, in communication with the boundary units 201, determines 108 proximity of the allocated vehicle 203a to the defined boundary 205 as disclosed in the detailed description of FIGS. 3-4. The vehicle control unit 501 sends 109 a warning signal to the user when the allocated vehicle 203a is in close proximity to the defined boundary 205.

The vehicle management system 200 manages 110 movement of the allocated vehicle 203a within the defined boundary 205. The vehicle control unit 501 restricts 110a movement of the allocated vehicle 203a within the defined boundary 205, when the allocated vehicle 203a is in close proximity to the defined boundary 205. When the allocated vehicle 203a is in close proximity to the defined boundary 205, the vehicle control unit 501 restricts the movement of the allocated vehicle 203a, for example, by reducing the speed of the allocated vehicle 203a to a low speed by controlling braking of the allocated vehicle 203a to bring the allocated vehicle 203a to a halt. The vehicle control unit 501 further restricts the movement of the allocated vehicle 203a, for example, by controlling locking of the wheels of the allocated vehicle 203a to disable the allocated vehicle 203a and bring the allocated vehicle 203a to a halt.

On reaching a destination, the user parks and secures the allocated vehicle 203a in the docking station 202 nearest to the destination. The locking unit 502 of this docking station 202 locks 110b the allocated vehicle 203a at the docking station 202. The client component 503 at this docking station 202 sends a message to the central server 204 to stop the timer 204d initiated for this allocated vehicle 203a. In an embodiment, the central server 204, in communication with each of the docking stations 202, the vehicle control unit 501, and the boundary units 201, logs 111 usage statistics of the allocated vehicle 203a and generates 112 billing information for the user based on the logged usage statistics. For example, the central server 204 tracks the allocated vehicle 203a using the vehicle identifier and the user identifier in the database 204b and determines the usage time from the timer 204d for billing the user.

In an embodiment, the central server 204, in communication with the boundary units 201, determines 113 location of the allocated vehicle 203a, when the allocated vehicle 203a is in close proximity to the defined boundary 205 and when the allocated vehicle 203a breaches the defined boundary 205. Each of the boundary units 201 defining the boundary 205 in the managing area 206 is given a unique identifier (ID). The central server 204 stores the unique identifier of each of the boundary units 201 in a database 204b residing in the central server 204 and associates each of the boundary units 201 with the nearest landmark, for example, a building name, gate number, etc., in and around the managing area 206. When an allocated vehicle 203a is disabled, the boundary unit 201 that is nearest to the allocated vehicle 203a sends a message to the central server 204. The central server 204 looks up the unique identifier of the boundary unit 201 stored in the database 204b and determines the location of the boundary unit 201. The central server 204 uses the location of the boundary unit 201 as a reference to determine the location of the disabled vehicle 203b. The central server 204 displays the location information on a graphical user interface, for example, by means of a map 2100, as exemplarily illustrated in FIG. 21, that highlights the location of the boundary unit 201 that is nearest to the allocated vehicle 203a that breached the defined boundary 205.

FIG. 2 exemplarily illustrates a managing area 206 managed by the vehicle management system 200. The vehicle management system 200 disclosed herein manages multiple vehicles 203 within the boundary 205 defined by the boundary units 201. The vehicle management system 200 is implemented within a perimeter 206a of the managing area 206. The boundary units 201 are positioned at predetermined locations along the perimeter 206a of the managing area 206 to define the boundary 205, thereby precluding the need for a physical fence along the perimeter 206a of the managing area 206. The defined boundary 205 represents the boundary 205 of the managing area 206 within which the vehicle management system 200 manages the vehicles 203.

Each of the boundary units 201 comprises a radio frequency (RF) transceiver 201b that defines a virtual boundary 205 of any shape and size. The boundary units 201 are positioned at intervals along the perimeter 206a of the managing area 206 that enable the RF transceivers 201b in the boundary units 201 to communicate with each other and define the boundary 205. The number of the boundary units 201 required to define the boundary 205 depends on a communication range 403 of the RF transceivers 201b and the number of corners 206b in the managing area 206. Each of the corners 206b along the perimeter 206a of the managing area 206 requires a boundary unit 201 positioned at that corner 206b for indicating the end of the boundary 205 at that corner 206b. The boundary units 201 are positioned such that the distance between two boundary units 201 is less than or equal to the communication range 403 of the RF transceivers 201b in the boundary units 201. The distance between two boundary units 201 lies, for example, between 70 meters and 100 meters. In an example, in the absence of the boundary unit C 201, the boundary 205 would be a straight line defined by AB between the boundary unit A 201 and the boundary unit B 201.

Multiple docking stations 202 are positioned at predetermined locations within the defined boundary 205. The docking stations 202 park and secure multiple vehicles 203. The docking stations 202 are positioned at places where users are most likely to congregate or pass through, for example, a car parking lot, a cafeteria, a building entrance, etc. The docking stations 202 are located across the managing area 206, for example, a college campus, such that a user can borrow a vehicle 203 from the docking station 202 nearest to the user, for example, near a car parking lot and travel to his destination, for example, a library and park the vehicle 203 in the docking station 202 near the library. When the vehicle 203 is parked at the docking station 202, the vehicle 203 is made available to other users. Therefore, the user need not return the vehicle 203 to the same docking station 202 from where the user borrowed the vehicle 203. Moreover, the user need not hold on to the vehicle 203 for the duration of the time the user spends at a destination; rather the user can take another vehicle 203 from the docking station 202 nearest to the user when the user needs to travel back from the destination. At any time, the vehicles 203 are either parked and secured in one of the docking stations 202, or are being used by the users.

The central server 204 monitors and keeps track of all the vehicles 203. For example, if the vehicle 203 is parked at the docking station 202, the central server 204, in communication with the docking station 202, tracks the vehicle 203 using the vehicle identifier and determines in which docking station 202 the vehicle 203 is parked. If the vehicle 203 is in use, the central server 204 tracks that a user is using the vehicle 203 using the vehicle identifier associated with the user identifier.

In an embodiment, the vehicle control unit 501 communicates with the boundary units 201 to detect auxiliary movement of the allocated vehicle 203a after locking or disabling of the allocated vehicle 203a. The vehicle control unit 501 detects the auxiliary movement of the disabled vehicle 203b by checking for change in its proximity to the boundary units 201 from the initial proximity that was determined at the instance when the allocated vehicle 203a was disabled using a proximity calculation algorithm disclosed in the detailed description of FIG. 3. If any change is detected, the central server 204 is notified about the theft attempt in progress.

Figure 3:
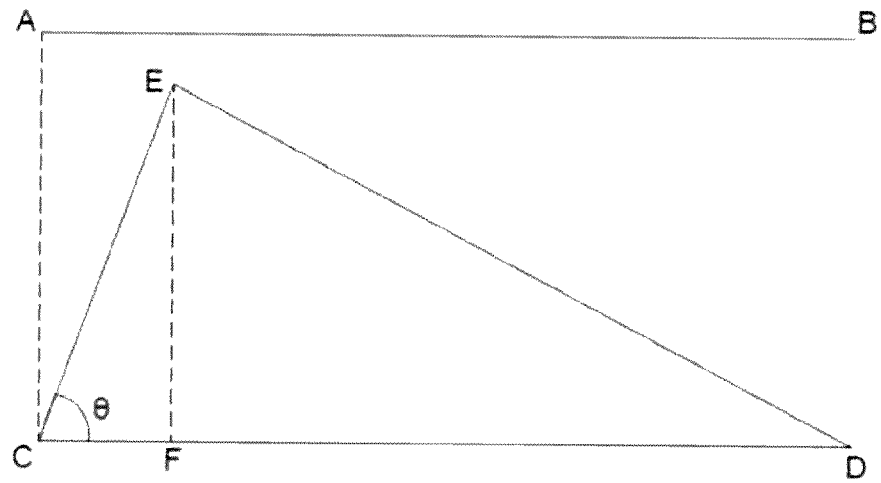
FIG. 3 exemplarily illustrates a geometrical representation implemented by a proximity calculation algorithm for determining proximity of an allocated vehicle to a boundary defined by multiple boundary units of the vehicle management system.

FIG. 3 exemplarily illustrates a geometrical representation implemented by a proximity calculation algorithm for determining proximity of an allocated vehicle 203a to a boundary 205 defined by multiple boundary units 201 of the vehicle management system 200. The proximity calculation algorithm determines if a point is in between two parallel lines, when the distance between the parallel lines and the distance between the point and the corners of one of the parallel lines is known. The boundary units 201 setup a critical grid 401 and a deadline grid 402 with reference to the defined boundary 205 as disclosed in the detailed description of FIG. 4. The parallel lines in FIG. 3 can be modeled as the line of the defined boundary 205 and the critical grid 401 or the line of the defined boundary 205 and the deadline grid 402. The point represents the allocated vehicle 203a whose location has to be determined. The corners of one of the parallel lines represent the boundary units 201.

Consider the corners C and D of the parallel line CD represent two boundary units 201. The defined boundary 205 is represented by the line CD, and the critical grid 401 or the deadline grid 402 is represented by the line AB in FIG. 3. The lines AB and CD are parallel to each other and separated by a distance CA. The allocated vehicle 203a is represented by the point E in FIG. 3. E is a point in proximity to the line AB. The vehicle control unit 501, in communication with the boundary units 201, determines whether the vehicle 203 represented by the point E is between the lines AB and CD as follows: Consider a triangle CED formed by the points C, E, and D. The vehicle control unit 501 computes the angle θ made by the lines CE and CD, for example, by applying the cosine rule:

$$ED^2 = CE^2 + CD^2 - 2(CE)(CD)\cos(\theta)$$

The vehicle control unit 501 obtains EF, for example, using the formula:

$$EF = CE \sin(\theta)$$

If the vehicle control unit 501 determines that EF is lesser than CA, then the vehicle control unit 501 determines that the point E lies between the lines AB and CD.

Figure 4:
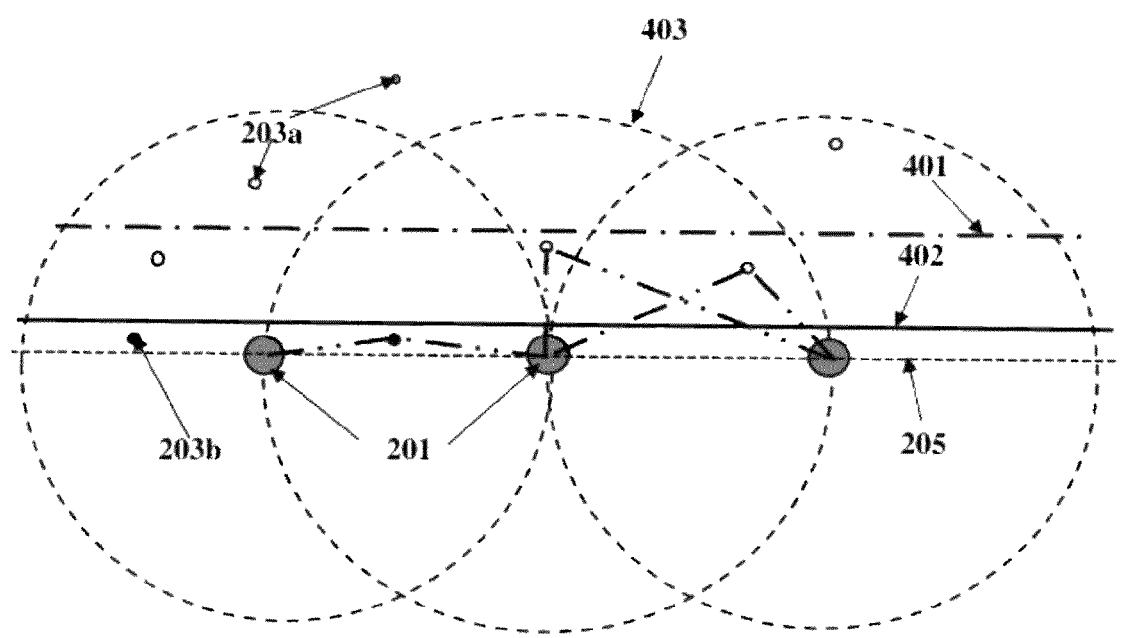
FIG. 4 exemplarily illustrates definition of grids by the boundary units of the vehicle management system for restricting movement of an allocated vehicle within a boundary defined by the boundary units.

FIG. 4 exemplarily illustrates definition of grids 401 and 402 by the boundary units 201 of the vehicle management system 200 for restricting movement of an allocated vehicle 203a within a boundary 205 defined by the boundary units 201. The boundary units 201 set up a critical grid 401 and a deadline grid 402 with reference to the defined boundary 205 within the communication range 403 of each of the boundary units 201. The boundary units 201 set the critical grid 401 at a distance from the defined boundary 205 that provides enough time for the allocated vehicle 203a to be slowed down to a low speed and locked before the allocated vehicle 203a crosses the defined boundary 205. The boundary units 201 set the critical grid 401 at a distance, for example, about 3 meters from the defined boundary 205 in the managing area 206. When the allocated vehicle 203a reaches the critical grid 401, the vehicle control unit 501 initiates braking of the allocated vehicle 203a. The boundary units 201 set the deadline grid 402 closer to the defined boundary 205 than the critical grid 401, to allow the allocated vehicle 203a to be locked and disabled before the allocated vehicle 203a breaches the defined boundary 205. The boundary units 201 set the deadline grid 402 at a distance, for example, about 1 meter from the defined boundary 205 in the managing area 206. On reaching the deadline grid 402, the vehicle control unit 501 initiates locking of the allocated vehicle 203a.

The vehicle control unit 501 of the allocated vehicle 203a broadcasts a beacon signal at regular intervals. The beacon signal is a data packet configured, for example, as a single hop signal and coded with a destination address class belonging to each of the boundary units 201. Each of the boundary units 201, in addition to having a unique ID, is also assigned an address identical to each type of boundary unit 201. For example, if the boundary units 201 are addressed within a range, for example, 0100 to 1000, then the address space 0100-1000 becomes the address class of the boundary units 201. The single hop feature of the beacon signal enables any boundary unit 201 to receive the beacon signal configured as "single hop" directly from the allocated vehicle 203a, but cannot re-route the beacon signal further. The boundary unit 201 that receives the single hop beacon signal drops the beacon signal if the destination address class of the beacon signal does not match its own destination address class. The vehicle control unit 501 continuously broadcasts the beacon signal at regular intervals until the vehicle control unit 501 gets a response from one or more of the boundary units 201.

One or more boundary units 201 receive the beacon signal when the allocated vehicle 203a enters the communication range 403 of the RF transceivers 201b of the boundary units 201. The beacon signal broadcasted by the vehicle control unit 501 further comprises the address of the allocated vehicle 203a coded into a source address field of the data packet of the beacon signal. Each of the boundary units 201, in response to the beacon signal, transmits a response signal comprising the address of the boundary unit 201 coded in a data packet of the response signal to the vehicle control unit 501.

Upon receiving the response signals from one or more of the boundary units 201, the vehicle control unit 501 computes the signal strengths of the received response signals by retrieving the received signal strength indicator (RSSI) values of the response signals. The process is repeated for about two trials for each of the boundary units 201. The vehicle control unit 501 computes an average RSSI value of the received response signals for each of the boundary units 201. The vehicle control unit 501 uses the average RSSI value to calculate the approximate distance between the allocated vehicle 203a and the responding boundary unit 201 by mapping the computed RSSI value on to a table that indicates a RSSI value-distance relation. The vehicle control unit 501 pre-generates the RSSI value-distance relation list by performing an adequate number of trials to measure the RSSI values at different known distances and by plotting the RSSI values to generate a reference table.

The vehicle control unit 501 then dynamically creates a list that enlists all the boundary units 201 with which the vehicle control unit 501 is able to receive a response signal. The list also specifies the respective distances of the allocated vehicle 203a from each of the boundary units 201, at an instance in time. When the list is created, the vehicle control unit 501 considers two of the boundary units 201 with the least distance from the allocated vehicle 203a.

The vehicle control unit 501, in communication with the boundary units 201, determines whether the allocated vehicle 203a has crossed the critical grid 401 or the deadline grid 402 by implementing the proximity calculation algorithm disclosed in the detailed description of FIG. 3. Based on the proximity calculation algorithm, the parallel lines can be modeled as the defined boundary 205 and the critical grid 401, or the defined boundary 205 and the deadline grid 402. The parallel lines are differentiated by the distances between the parallel lines. The corners of one of the parallel lines represent the boundary units 201. By retrieving the RSSI values, the vehicle control unit 501 determines the distance of the allocated vehicle 203a from the boundary units 201. If the distance between the allocated vehicle 203a and the defined boundary 205 is more than the distance between the critical grid 401 and the defined boundary 205, the vehicle control unit 501 determines that the defined boundary 205 and the critical grid 401 are not breached by the allocated vehicle 203a. If the defined boundary 205 is not breached by the allocated vehicle 203a, the vehicle control unit 501 takes no action. The distance between the allocated vehicle 203a and the boundary units 201 is refreshed and the proximity calculation algorithm is executed at regular intervals to detect any breach of the defined boundary 205 as long as the allocated vehicle 203a is within the communication range 403 of the boundary units 201.

If the distance between the allocated vehicle 203a and the defined boundary 205 is lesser than the distance between the critical grid 401 and the defined boundary 205, the vehicle control unit 501 determines that the critical grid 401 is breached by the allocated vehicle 203a. If the allocated vehicle 203a breaches the critical grid 401, the vehicle control unit 501 sends a warning signal to the user. The vehicle control unit 501 notifies the user by playing an audio signal, for example, an iterative beep through the speaker 501i for alerting the user to move out of the critical grid 401 as soon as possible. Moreover, the vehicle control unit 501 monitors the speed of the allocated vehicle 203a using on-board Hall effect sensors 1402f as exemplarily illustrated in FIG. 15. The vehicle control unit 501 gradually reduces the speed of the allocated vehicle 203a if the speed is more than a preset speed limit, for example, 5 kilometers per hour. The preset speed is the speed that is safe for halting and locking the allocated vehicle 203a in case the allocated vehicle 203a breaches the deadline grid 402, without damaging the vehicle control unit 501 and a disabling unit 1402 operably connected to the allocated vehicle 203a or posing danger to the user, for example, a rider who may be thrown off the allocated vehicle 203a if the allocated vehicle 203a is locked at high speeds.

In cases where a large number of allocated vehicles 203a simultaneously try to breach the defined boundary 205, the low speed maintained by the vehicle control units 501 in each of the allocated vehicles 203a provides a buffer time for the boundary units 201 to communicate with other allocated vehicles 203a. Moreover, the low speed of the allocated vehicle 203a provides the vehicle control unit 501 in each allocated vehicle 203a enough time to lock and disable each allocated vehicle 203a, if necessary, before the allocated vehicles 203a manage to breach the defined boundary 205 and go outside the premises of the campus.

If the distance between the allocated vehicle 203a and the defined boundary 205 is lesser than the distance between the deadline grid 402 and the defined boundary 205, the vehicle control unit 501 determines that the deadline grid 402 is breached by the allocated vehicle 203a. When the allocated vehicle 203a breaches the deadline grid 402, the vehicle control unit 501 notifies the user about the breach, and stops and disables the allocated vehicle 203a. When the vehicle control unit 501 disables the allocated vehicle 203a, the vehicle control unit 501 on the disabled vehicle 203b sends a breach signal that contains the vehicle identifier (ID) of the disabled vehicle 203b to the nearest boundary unit 201, that is, the first boundary unit 201 listed in the list, which in turn forwards the breach signal to the central server 204 through the communication network 510 established by the boundary units 201.

Upon receiving the breach signal from the disabled vehicle 203b, the first boundary unit 201 before forwarding the breach signal to the next boundary unit 201 in the networked environment via the communication network 510 that leads to the central server 204, appends its own unique ID to the breach signal. The central server 204 can therefore determine the location of the disabled vehicle 203b using the unique ID of the first boundary unit 201 as disclosed in the detailed description of FIG. 1. The central server 204 renders the determined location, for example, as a position on a map 2100 displayed on a graphical user interface of the central server 204 for viewing by a system administrator, as disclosed in the detailed description of FIG. 21.

In an embodiment, the system administrator sends an enable signal to the disabled vehicle 203b from the central server 204 to re-enable the disabled vehicle 203b. The enable signal travels via the communication network 510 to reach the disabled vehicle 203b. The enable signal triggers the disabling unit 1402 to re-enable the disabled vehicle 203b by unlocking the disabled vehicle 203b.

Figure 5:
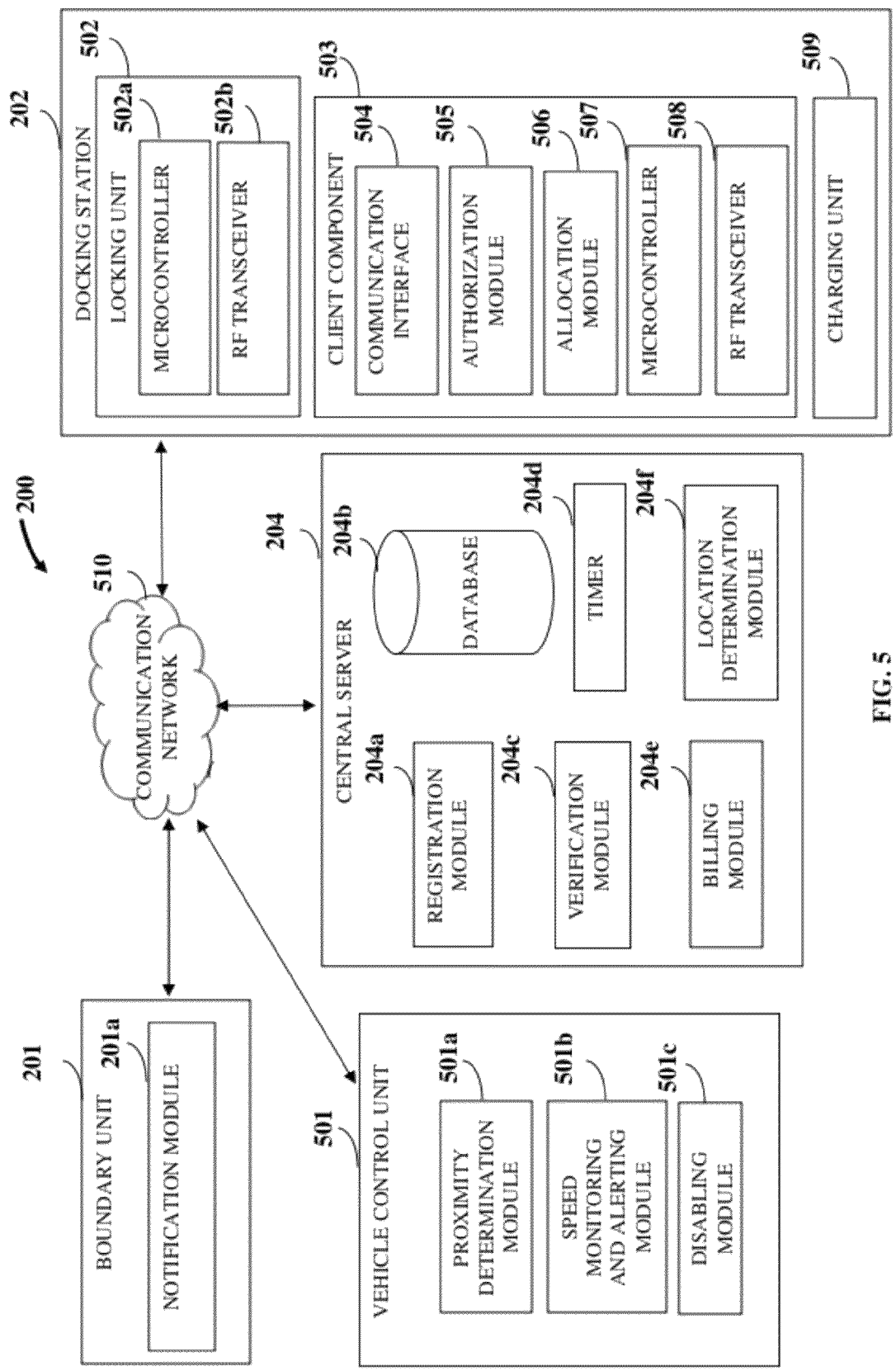
FIG. 5 illustrates a system for managing multiple vehicles within a boundary.

FIG. 5 illustrates a system 200 for managing multiple vehicles 203 within a boundary 205. The vehicle management system 200 disclosed herein comprises multiple boundary units 201, multiple docking stations 202, a vehicle control unit 501 mounted on each of the vehicles 203, and a central server 204 connected via a communication network 510 in a networked environment. The communication network 510 is, for example, a WiFi communication network, a general packet radio service (GPRS) network, Zigbee® communication network, a mobile telecommunication network, a local area communication network, an internet connection network, a Bluetooth™ communication network, an infrared communication network, etc.

The boundary units 201 are positioned at predetermined locations along a perimeter 206a of a managing area 206 to define a boundary 205 as exemplarily illustrated in FIG. 2. The docking stations 202 are positioned at predetermined locations within the defined boundary 205 as exemplarily illustrated in FIG. 2. The docking stations 202 park and secure multiple vehicles 203. Each of the docking stations 202 comprises a client component 503 and a locking unit 502. In an embodiment, each of the docking stations 202 further comprises a charging unit 509 for charging the vehicle control unit 501 of each of the vehicles 203.

The central server 204 is in electronic communication with the boundary units 201, the docking stations 202, and the vehicle control unit 501 in a networked environment. The central server 204 monitors and manages the boundary units 201, the docking stations 202, and the vehicle control unit 501. The central server 204 comprises a registration module 204a that registers users, the vehicles 203, the docking stations 202, and the boundary units 201. The central server 204 stores the identification information of the registered users, the registered vehicles 203, the registered docking stations 202, and the registered boundary units 201 in a database 204b residing in the central server 204. The registration module 204a acquires personal information, contact information such as a mobile phone number, etc., from the user during registration. The central server 204 stores the acquired information in the database 204b. The central server 204 further comprises a verification module 204c that verifies identification information received from the user via a communication interface 504 provided by the client component 503.

Figure 7:
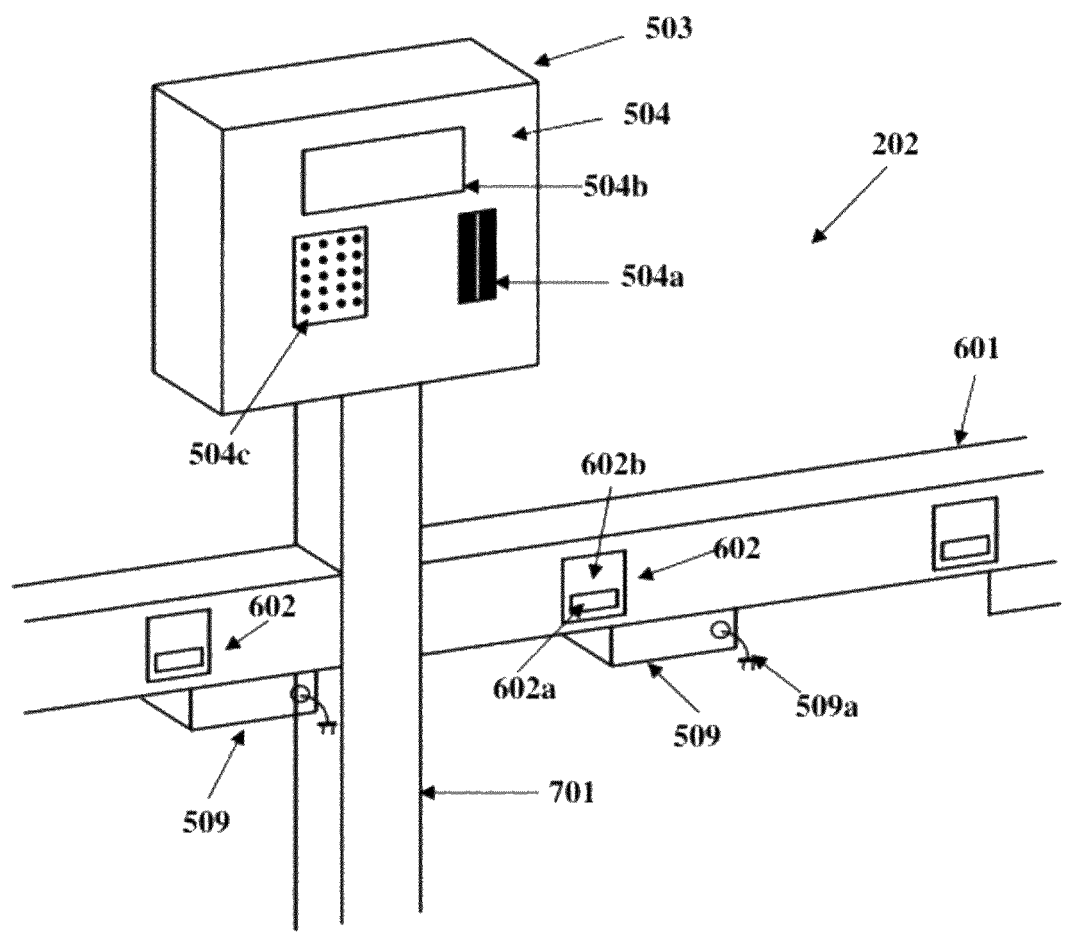
FIG. 7 exemplarily illustrates a perspective view of a support structure of a docking station, showing a client component rigidly attached to the support structure, and securing components housed in the support structure.

The client component 503 comprises the communication interface 504 implemented as an input and output interface for the user as disclosed in the detailed description of FIG. 7. The communication interface 504 receives the identification information from the user for authorization of the user. The client component 503 further comprises a microcontroller 507 and a radio frequency (RF) transceiver 508 as exemplarily illustrated in FIG. 5 and disclosed in the detailed description of FIG. 9. The client component 503 further comprises an authorization module 505 and an allocation module 506. The authorization module 505, in communication with the central server 204 via the communication network 510, authorizes the user prior to allocation of one of the vehicles 203 to the user. The allocation module 506, in communication with the central server 204 via the communication network 510, allocates one of the vehicles 203 from one of the docking stations 202 to the user based on allocation criteria comprising, for example, charge level of each of the vehicles 203, user authorization, etc. The allocation module 506 determines the charge level of each of the vehicles 203 for selecting one of the vehicles 203 for allocation to the user. The allocation module 506 determines the vehicle identifier of the selected vehicle 203, communicates the vehicle identifier to the locking unit 502, and instructs the locking unit 502 to disengage that vehicle 203 from the docking station 202. The locking unit 502 then slides along the support structure 601 of the docking station 202 and scans the vehicle identifier, for example, a radio frequency identifier on a radio frequency identification (RFID) tag mounted on the protruding element 1001 of each of the vehicles 203 in that docking station 202. When the locking unit 502 encounters the RFID tag matching with the vehicle identifier indicated by the allocation module 506, the locking unit 502 locates the vehicle 203 that needs to be disengaged.

The locking unit 502 is slidably attached on the support structure 601 in each of the docking stations 202. The locking unit 502 slides along the support structure 601 in the docking station 202 to the determined position of the selected vehicle 203 and disengages the selected vehicle 203 from a securing component 602 provided on the support structure 601. The locking unit 502 locks and unlocks the allocated vehicles 203a by engaging and disengaging the allocated vehicles 203a from the securing component 602 as disclosed in the detailed description of FIG. 11. The locking unit 502 contacts the securing component 602 for engaging and disengaging the allocated vehicle 203a from the docking station 202. The locking unit 502 further comprises a microcontroller 502a and a radio frequency (RF) transceiver 502b as exemplarily illustrated in FIG. 5 and disclosed in the detailed description of FIG. 9.

Figure 14:
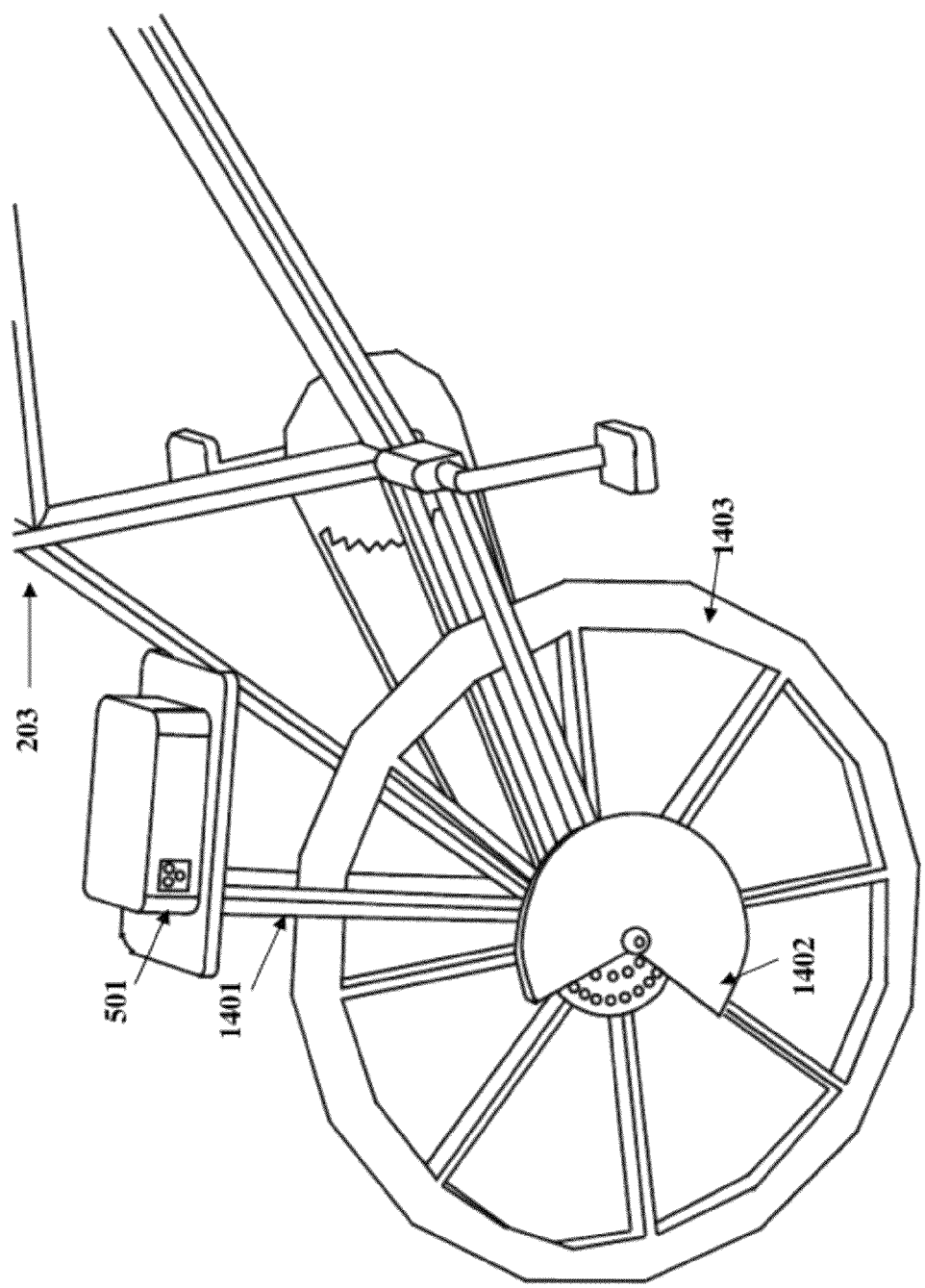
FIG. 14 exemplarily illustrates a perspective view of the vehicle control unit and a disabling unit mounted on a vehicle.

The vehicle control unit 501 is electromechanically connected to each of the vehicles 203 as exemplarily illustrated in FIG. 14. The vehicle control unit 501 is in electronic communication with the boundary units 201 and the client component 503 in each of the docking stations 202. The vehicle control unit 501 comprises a proximity determination module 501a, a speed monitoring and alerting module 501b, and a disabling module 501c. The proximity determination module 501a, in communication with the boundary units 201, determines proximity of the allocated vehicle 203a to the defined boundary 205 as disclosed in the detailed description of FIGS. 3-4. The speed monitoring and alerting module 501b monitors the speed of the allocated vehicle 203a. The speed monitoring and alerting module 501b also sends a warning signal to the user when the allocated vehicle 203a is in close proximity to the defined boundary 205. The disabling module 501c restricts movement of the allocated vehicle 203a within the defined boundary 205, when the allocated vehicle 203a is in close proximity to the defined boundary 205.

The vehicle management system 200 disclosed herein further comprises a disabling unit 1402 operably connected to each of the vehicles 203 and the vehicle control unit 501 as exemplarily illustrated in FIG. 14. The disabling unit 1402 comprises a brake actuator 1402b and a lock actuator 1402c as exemplarily illustrated in FIG. 15. The brake actuator 1402b is operably connected to the wheels 1403 of each vehicle 203. The disabling module 501c of the vehicle control unit 501 controls the brake actuator 1402b for braking the allocated vehicle 203a to bring the allocated vehicle 203a to a halt or to slow the allocated vehicle 203a down to a restricted speed upon breaching the critical grid 401 defined by the boundary units 201. The lock actuator 1402c is operably connected to the wheels 1403 of each vehicle 203. The disabling module 501c of the vehicle control unit 501 controls the lock actuator 1402c for locking the wheels 1403 of the allocated vehicle 203a, when the allocated vehicle 203a attempts to breach the defined boundary 205.

The locking unit 502 scans through the RFID tags of each of the vehicles 203 for unlocking the allocated vehicle 203a by sliding across the support structure 601 of the docking station 202 and locates the allocated vehicle 203a whose vehicle identifier matches with the vehicle identifier indicated by the allocation module 506 of the client component 503. The locking unit 502 unlocks the allocated vehicle 203a and then indicates the same to the client component 503. The client component 503 then requests the vehicle control unit 501 of that allocated vehicle 203a to unlock the onboard disabling unit 1402 of the allocated vehicle 203a to completely unlock the allocated vehicle 203a.

In an embodiment, each of the boundary units 201 comprises a notification module 201a that sends a notification to the central server 204 when the allocated vehicle 203a breaches the defined boundary 205. In another embodiment, the central server 204 further comprises a location determination module 204f that communicates with the boundary units 201 to determine location of the allocated vehicle 203a, when the allocated vehicle 203a is in close proximity to or breaches the defined boundary 205.

In another embodiment, the vehicle control unit 501 continues communicating with the boundary units 201 to detect auxiliary movement of the allocated vehicle 203a after locking or disabling of the allocated vehicle 203a, by determining the change in proximity to the boundary units 201 from the initial proximity determined by the vehicle control unit 501 at the instance when the allocated vehicle 203a was disabled. The speed monitoring and alerting module 501b of the vehicle control unit 501 sends a notification to the central server 204 on detection of auxiliary movement of the disabled vehicle 203b.

In an embodiment, the central server 204 further comprises a timer 204d that measures usage time of the allocated vehicle 203a from disengagement from one docking station 202 to engagement to another docking station 202. The database 204b in the central server 204 logs usage statistics of the allocated vehicle 203a, in communication with each of the docking stations 202, the vehicle control unit 501, and the boundary units 201. The central server 204 further comprises a billing module 204e that generates billing information for the user based on the logged usage statistics and the usage time measured by the timer 204d. The billing module 204e transmits the generated billing information to the user's communication device, for example, a mobile phone using a messaging service gateway, for example, a short message service (SMS) gateway. The billing module 204e retrieves the user's mobile phone number from the user information stored in the database 204b of the central server 204 to transmit the generated billing information.

Figure 6:
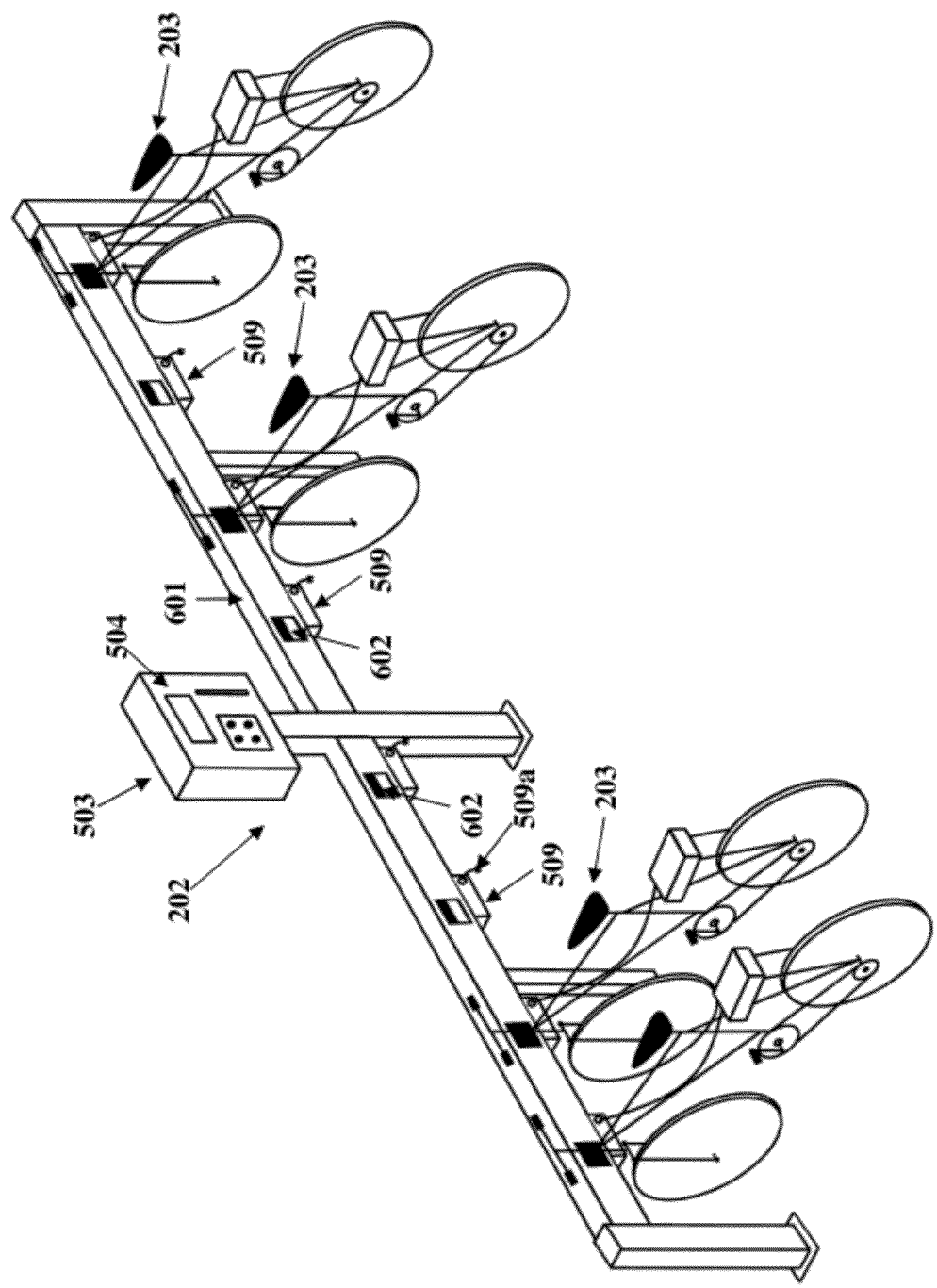
FIG. 6 exemplarily illustrates a perspective view of a docking station with multiple vehicles parked and secured to the docking station.

FIG. 6 exemplarily illustrates a perspective view of a docking station 202 with multiple vehicles 203 parked and secured to the docking station 202. The docking station 202 parks and secures the vehicles 203 that are not in use. The docking station 202 also charges batteries 501d of the vehicle control unit 501 of each of the vehicles 203 using the charging unit 509, when the vehicles 203 are parked. The charging unit 509 comprises a retractable charging cable 509a that can be plugged into the charging socket 501k of the vehicle control unit 501 exemplarily illustrated in FIG. 12, for charging the battery 501d of the vehicle control unit 501. The docking station 202 comprises the client component 503 that, in communication with the central server 204, allocates one of the vehicles 203 from the docking station 202 to a user based on allocation criteria. The client component 503 also acts as a communication gateway between the docking station 202 and the central server 204.

The client component 503 is supported by the support structure 601 of the docking station 202. The support structure 601 is, for example, a hollow rectangular metal plank. The support structure 601 also houses multiple securing components 602 that secure the vehicles 203 parked at the docking station 202. Each of the securing components 602 in the docking station 202 parks one vehicle 203 and the number of vehicles 203 that can be parked in the docking station 202 is limited by the number of securing components 602 available on the support structure 601 of the docking station 202.

FIG. 7 exemplarily illustrates a perspective view of a support structure 601 of a docking station 202, showing a client component 503 rigidly attached to the support structure 601, and securing components 602 housed in the support structure 601. The client component 503 is connected to and rests on a support pillar 701 of the support structure 601. The client component 503 provides the communication interface 504 for receiving identification information from a user. The client component 503, in electronic communication with the central server 204, authorizes the user for allocating one of the vehicles 203 in the docking station 202 to the user. The communication interface 504 comprises input devices 504a and output devices 504b. The input devices 504a receive input identification information from the user. The input devices 504a are, for example, a barcode reader, a radio frequency identification (RFID) scanner, an iButton, biometric scanner, etc. The communication interface 504 also provides a keypad 504c comprising a push button that allows the user to initiate the allocation process. One of the output devices 504b is a screen, for example, a liquid crystal display (LCD) screen, a light emitting diode (LED) screen, etc. The output devices 504b display information, for example, authorization status, to the user.

Each registered user receives a user identifier, for example, a barcode, an RFID, an iButton tag, etc. The user identifier is, for example, coded onto an identifier (ID) tag that can be carried by the user. In the case of a biometric user identifier, the registered user's biometric data, for example, fingerprints, iris scan data, etc., is stored in the database 204b of the central server 204. The input devices 504a receive the user identifier from the user who requires a vehicle 203 from the docking station 202. In an example, a biometric scanner scans the fingerprint of the user.

If a user A loses the ID tag comprising the user identifier and does not register a complaint, a user B who finds the lost ID tag can use the lost ID card in the name of user A. To avoid this and to ensure security of the user's identification, the central server 204 associates a password with each user identifier. The user can change the password after the user identifier is assigned to the user. Before authorizing the user, the client component 503 additionally requests the user for the password after receiving the user identifier from the user via the input devices 504a. In an example, the user swipes a barcode tag at the barcode reader and then the client component 503 requests the user for the password via an LCD screen. The user can input the password using the keypad 504c. In another example, a biometric scanner acquires the biometric traits of the user for authorization.

Each of the securing components 602 housed on the support structure 601 comprises a securing socket 602a configured on a base plate 602b that secures each vehicle 203 when the vehicles 203 are parked in the docking station 202. The securing socket 602a acts as a female socket to a protruding element 1001 attached in front of each of the vehicles 203. When the protruding element 1001 is inserted into the securing socket 602a, the vehicle 203 is locked from inside via the locking unit 502 and is released only on allocation of the vehicle 203 by the client component 503 as disclosed in the detailed description of FIG. 11.

Figure 8:
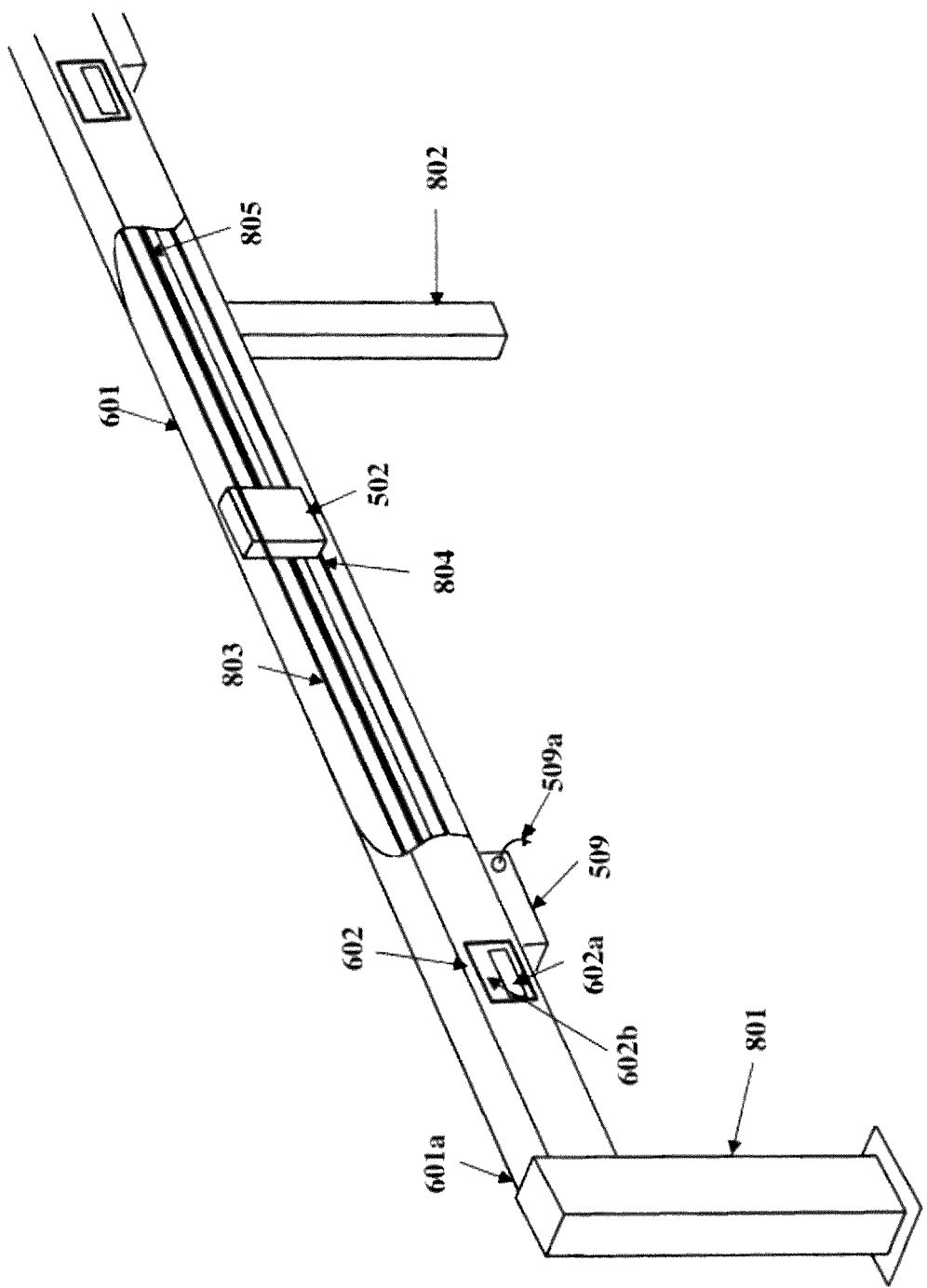
FIG. 8 exemplarily illustrates a partially cut away rear perspective view of a docking station, showing a locking unit slidably attached in the support structure.

FIG. 8 exemplarily illustrates a partially cut away rear perspective view of a docking station 202, showing a locking unit 502 slidably attached in the support structure 601. Support pillars 801 vertically attached to the support structure 601 support the support structure 601 of the docking station 202. Multiple support pillars 802 vertically attached to the support structure 601 are provided at regular intervals between the support pillar 801 and the support pillar 701 that supports the client component 503 for providing additional support to the support structure 601 of the docking station 202. The support pillars 802 add robustness to the support structure 601 of the docking station 202 and increase the distance between the support pillar 801 and the support pillar 701 of the client component 503. The more the number of support pillars 802 provided on the support structure 601 the more the number of vehicles 203 that can be parked in the docking station 202.

The support structure 601 comprises grids 803 and 804 that are horizontal strips of metal that run along the length of the support structure 601 of the docking station 202. The locking unit 502 is slidably attached to the support structure 601, such that the locking unit 502 moves along the grids 803 and 804 in the support structure 601. The support structure 601 further comprises a teethed metal strip 805 that runs along the length of the support structure 601. The locking unit 502 comprises a first drive mechanism 901, for example, a geared motor that drives the locking unit 502 across the length of the support structure 601. The first drive mechanism 901 of the locking unit 502 sits on the teethed metal strip 805 and is driven on the teethed metal strip 805 as disclosed in the detailed description of FIG. 9.

Figure 9:
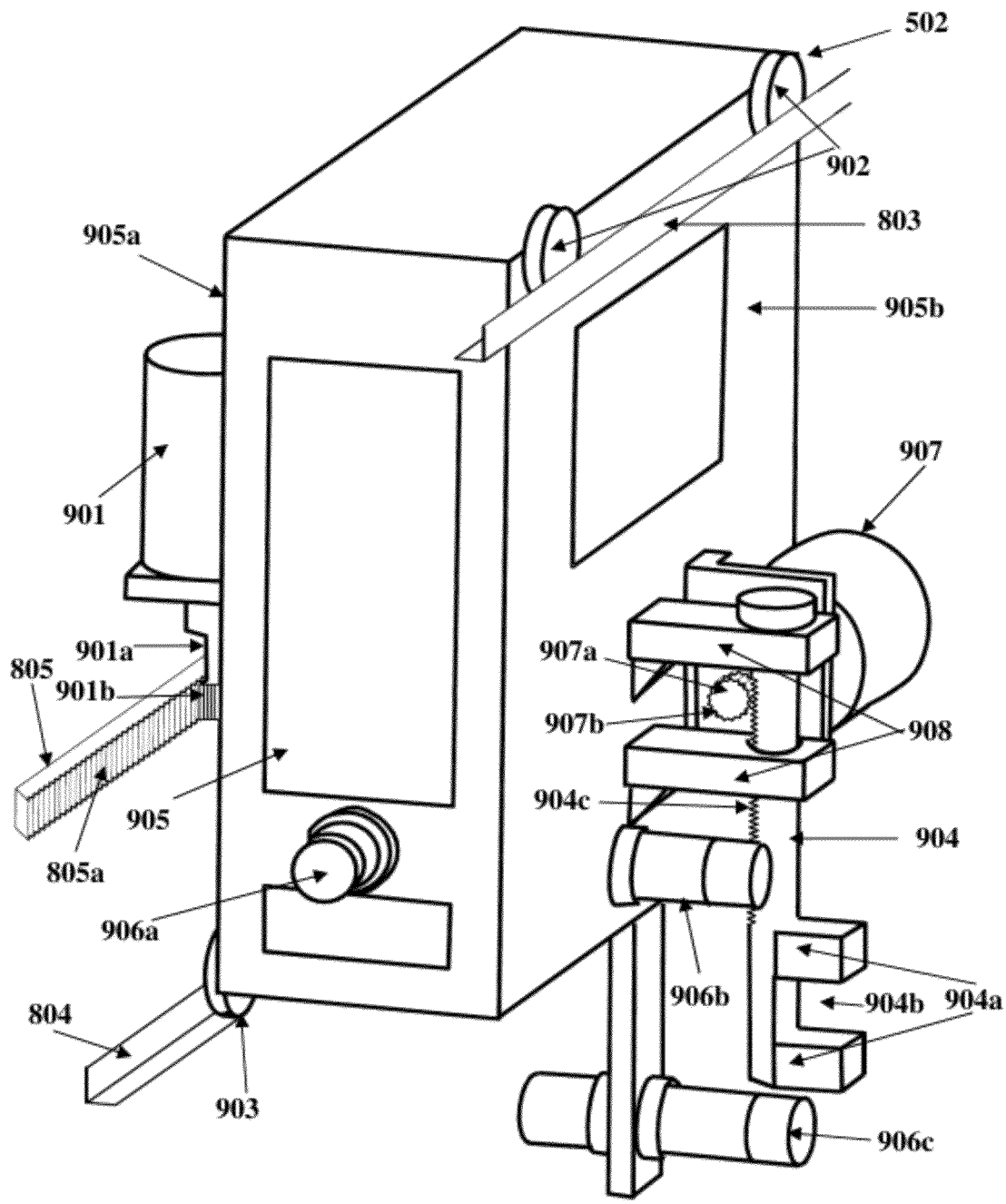
FIG. 9 exemplarily illustrates a perspective view of a locking unit of a docking station.

FIG. 9 exemplarily illustrates a perspective view of a locking unit 502 of a docking station 202. The locking unit 502 slides along the length of the support structure 601 for locking and unlocking the vehicles 203 parked in the docking station 202. The locking unit 502 comprises a frame like housing 905 that supports components, for example, 904, 907, etc., required for locking and unlocking operations and also the components, for example, 901, 902, 903, etc., required for movement of the locking unit 502 across the docking station 202.

The locking unit 502 comprises a first drive mechanism 901 operably connected to a first opposing surface 905a of a housing 905 of the locking unit 502. The first drive mechanism 901, for example, a geared motor, drives the locking unit 502 along the length of the support structure 601 via a shaft 901a. The first drive mechanism 901 sits on a teethed metal strip 805 along the length of the support structure 601, and drives the locking unit 502 on the teethed metal strip 805. When the first drive mechanism 901 is activated, the locking unit 502 moves on the teethed metal strip 805 based on the direction of rotation of the shaft 901a on the teethed metal strip 805. Gear teeth 901b of the shaft 901a engage with gear teeth 805a of the teethed metal strip 805 to move the locking unit 502 along the length of the support structure 601. A pair of rotating elements 902 and 903 supports the locking unit 502 on the grids 803 and 804 of the support structure 601 during the movement of the locking unit 502 along the length of the support structure 601. The rotating elements 902 and 903 hold the locking unit 502 horizontally and move on the grids 803 and 804 respectively. The locking unit 502 further comprises the microcontroller 502a and the RF transceiver 502b in the housing 905 of the locking unit 502. Since the locking unit 502 moves across a small distance, the locking unit 502 can also be powered using the retractable charging cable 509a of the charging unit 509. In an embodiment, a provision is made for providing wireless power supply to the locking unit 502 for charging a battery (not shown) of the locking unit 502 when the locking unit 502 is not in use.

The locking unit 502 further comprises inductive proximity sensors 906a, 906b, and 906c positioned on and supported by the housing 905 of the locking unit 502. The default position of the locking unit 502 is on one end 601a of the support structure 601 as defined by a first inductive proximity sensor 906a. The first inductive proximity sensor 906a is connected to the input of the microcontroller 502a in the housing 905 of the locking unit 502. The first inductive proximity sensor 906a sends a signal to the microcontroller 502a when the locking unit 502 comes in close proximity, for example, about 10 mm to about 15 mm, to any metal surface. When the allocation module 506 of the client component 503 determines which of the vehicles 203 needs to be allocated to the user, the allocation module 506 sends the vehicle identifier of the allocated vehicle 203a that needs to be locked or unlocked to the locking unit 502. The locking unit 502 then moves along the support structure 601 scanning the RFID tags mounted on the protruding elements 1001 of the vehicles 203, locates the allocated vehicle 203a whose RFID tag matches with the vehicle identifier indicated by the allocation module 506, and performs the locking or unlocking operation as indicated by the allocation module 506. The first drive mechanism 901 drives the locking unit 502 across the support structure 601. The locking unit 502 is moved from its default position by passing a current signal to the first drive mechanism 901 in such a way as to move the locking unit 502 away from the default position. The microcontroller 502a disposed in the housing 905 of the locking unit 502 controls the current signal passed to the first drive mechanism 901. After the locking or unlocking operation, a current signal is passed to the first drive mechanism 901 in the opposite direction for activating the first drive mechanism 901 to return the locking unit 502 to its default position. The current signal is passed to the first drive mechanism 901 until a signal is received from the first inductive proximity sensor 906a, which is fed as sensing input to the microcontroller 502a.

The locking unit 502 further comprises a pair of jaw members 904a defined on a handle 904 rigidly attached to a second opposing surface 905b of the housing 905 of the locking unit 502 via horizontal bars 908. The horizontal bars 908 extend outwardly from the second opposing surface 905b of the housing 905 of the locking unit 502 and support the handle 904 having the jaw members 904a. The pair of jaw members 904a extends outwardly from the handle 904 and defines a space 904b for receiving an outwardly protruding extension 1101a of an elongate member 1101 of the securing component 602 that in turn locks the protruding element 1001 extending from each of the vehicles 203. A push switch (not shown) is provided in the securing component 602 that is engaged by the protruding element 1001 extending from each of the vehicles 203. The output of the push switch is fed to the microcontroller 507 of the client component 503 to notify the microcontroller 507 each time a new vehicle 203 is returned to the docking station 202. In order to reduce the amount of computations and circuitry, output lines of the push switches at each securing component 602 in the docking station 202 are routed to a single input line of the microcontroller 507 in the client component 503 through a multiplexer. Thus, the microcontroller 507 senses if a new vehicle 203 has been returned to the docking station 202.

The locking unit 502 further comprises a second drive mechanism 907, for example, a geared motor having a shaft 907a, engageably connected to the handle 904 for moving the handle 904 vertically in an upward direction and a downward direction, whereby the outwardly protruding extension 1101a of the elongate member 1101 of the securing component 602 held within the space 904b defined by the pair of jaw members 904a of the moved handle 904 is moved in the upward direction and the downward direction for disengaging and engaging the protruding element 1001 extending from each of the vehicles 203. The second drive mechanism 907 drives the handle 904 vertically up and down. The handle 904 is configured with gear teeth 904c on one side of the handle 904 in engageable communication with gear teeth 907b of the shaft 907a of the second drive mechanism 907. The gear teeth 907b of the shaft 907a of the second drive mechanism 907 engageably communicates with the gear teeth 904c on one side of the handle 904 to drive the handle 904 vertically in an upward direction and a downward direction. The pair of jaw members 904a on the handle 904 is driven vertically in an upward direction to disengage the protruding element 1001 of the allocated vehicle 203a from the securing component 602, thereby unlocking the allocated vehicle 203a. The pair of jaw members 904a is driven vertically in a downward direction to engage the protruding element 1001 of the allocated vehicle 203a, thereby locking the allocated vehicle 203a. Based on the signal received by the RF transceiver 502b in the housing 905 of the locking unit 502, the microcontroller 502a in the housing 905 decides the direction of rotation of the second drive mechanism 907 for locking and unlocking operations to occur.

The second inductive proximity sensor 906b and the third inductive proximity sensor 906c identify the status of each securing component 602 in the docking station 202. The second inductive proximity sensor 906b and the third inductive proximity sensor 906c identify whether there is a vehicle 203 secured in the securing component 602 on the docking station 202. If there is a vehicle 203 secured in the securing component 602, the second inductive proximity sensor 906b and the third inductive proximity sensor 906c identify whether the vehicle 203 is locked. The locking unit 502 uses different combinations of the signals sent by the second inductive proximity sensor 906b and the third inductive proximity sensor 906c to identify the status of each securing component 602 as disclosed in the detailed description of FIG. 11.

The second inductive proximity sensor 906b and the third inductive proximity sensor 906c also detect the arrival of a new vehicle 203. When a vehicle 203 is returned to the docking station 202, the push switch of the securing component 602 engages the protruding element 1001 fitted in front of the vehicle 203. The push switch circuit is connected to one of the inputs of the microcontroller 507 in the client component 503 of the docking station 202. The RF transceiver 508 in the client component 503 then sends a signal to the locking unit 502 indicating the arrival of the vehicle 203. The locking unit 502 then starts moving away from the default position and scans each securing component 602 in the docking station 202 to check for the status of the second inductive proximity sensor 906b and the third inductive proximity sensor 906c until the locking unit 502 arrives at the securing component 602 that engaged the arrived vehicle 203.

Figure 10:
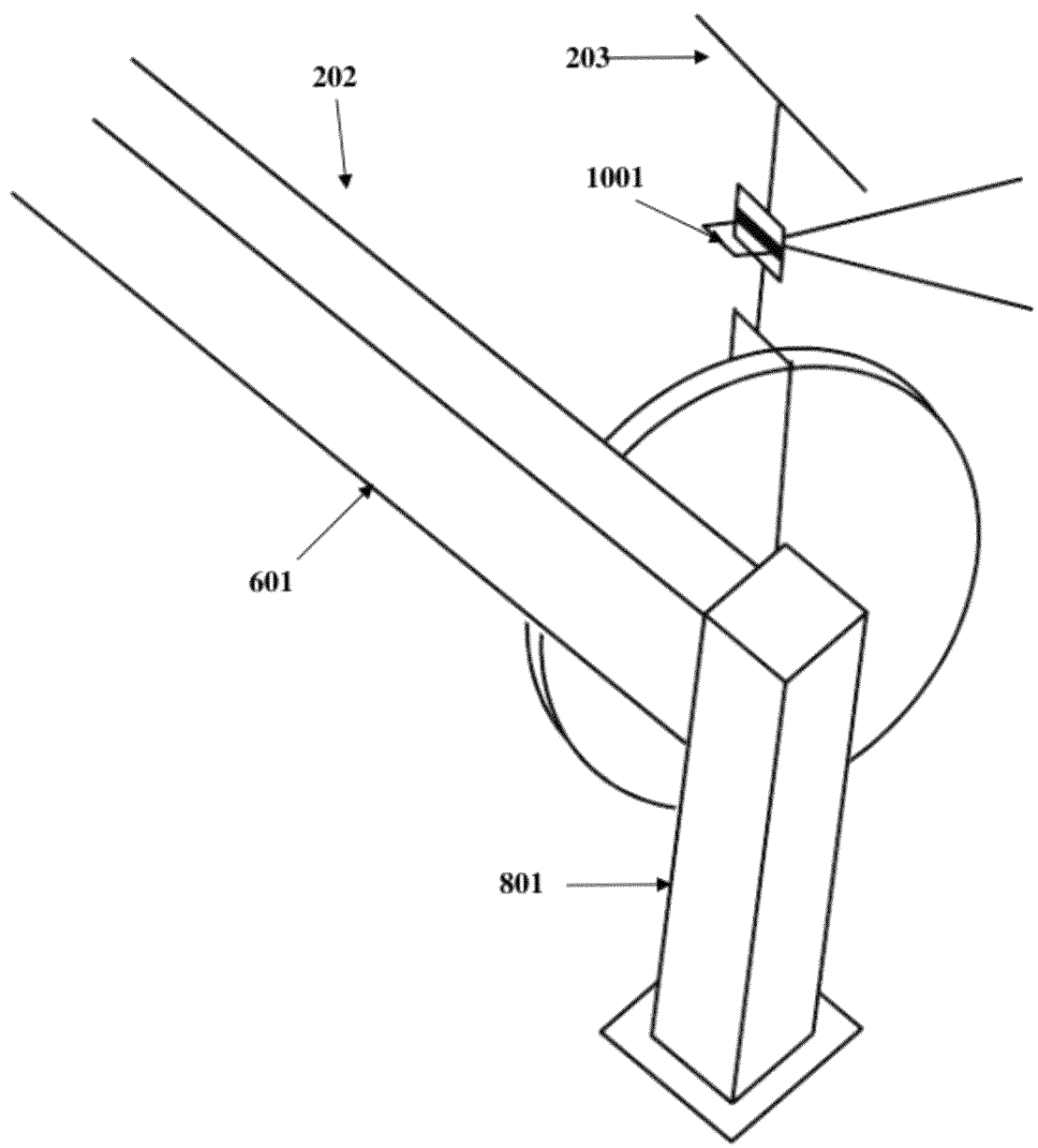
FIG. 10 exemplarily illustrates a protruding element extending from a vehicle for insertion into a securing socket of a securing component housed in the support structure.

FIG. 10 exemplarily illustrates a protruding element 1001 extending from a vehicle 203 for insertion into a securing socket 602a of a securing component 602 housed in the support structure 601. Each of the vehicles 203 comprises the protruding element 1001 attached, for example, proximal to the handle of the vehicles 203. The protruding element 1001 is, for example, a ring shaped protrusion fitted on each of the vehicles 203. When a vehicle 203 needs to be parked in the docking station 202, the protruding element 1001 is inserted into the securing socket 602a of the securing component 602 on the support structure 601 in the docking station 202.

Figure 11:
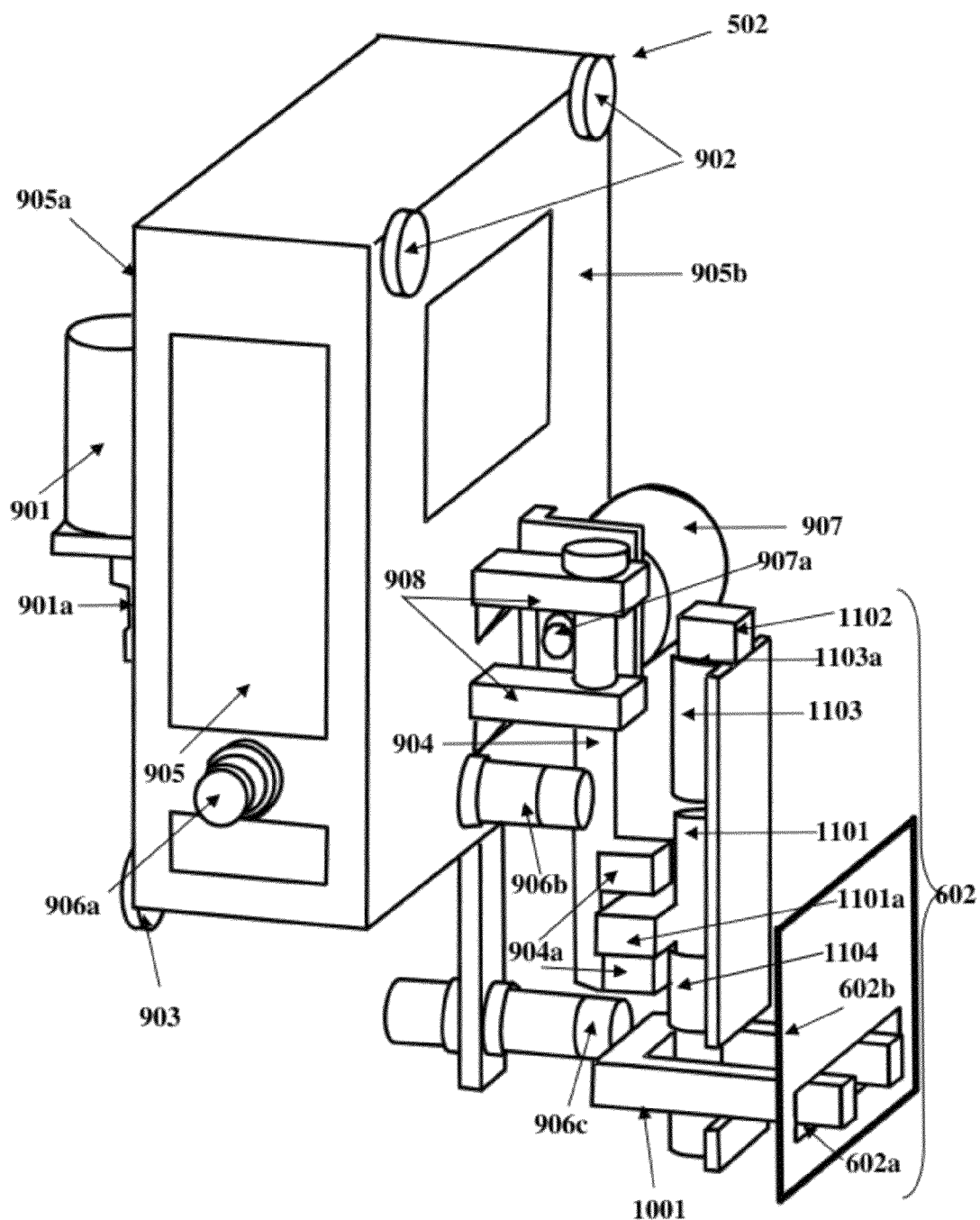
FIG. 11 exemplarily illustrates engagement of the protruding element of the vehicle to the securing component in the docking station, where the locking unit engages and disengages the protruding element of the vehicle from the securing component.

FIG. 11 exemplarily illustrates engagement of the protruding element 1001 of the vehicle 203 to the securing component 602 in the docking station 202, where the locking unit 502 engages and disengages the protruding element 1001 of the vehicle 203 from the securing component 602. The securing component 602 comprises an elongate member 1101 with an outwardly protruding extension 1101a and a securing socket 602a. The securing socket 602a is configured on a base plate 602b rigidly attached to the elongate member 1101. The securing socket 602a receives the protruding element 1001 extending from the allocated vehicle 203a for securing the allocated vehicle 203a by the elongate member 1101. The pair of jaw members 904a of the handle 904 of the locking unit 502 receives the outwardly protruding extension 1101a of the elongate member 1101 of the securing component 602 and moves the elongate member 1101 in an upward direction and a downward direction for engaging and disengaging the allocated vehicle 203a from a position determined by the allocation module 506 of the client component 503 on reaching the determined position.

The elongate member 1101 has a bolt like structure on the inside of the securing component 602 supported by a first hollow tubular member 1103 disposed at the top of the securing component 602. The elongate member 1101 is fitted with the outwardly protruding extension 1101a, which is used to move the elongate member 1101 vertically. The outwardly protruding extension 1101a of the elongate member 1101 fits into the space 904b defined between the jaw members 904a of the handle 904 of the locking unit 502. Therefore, moving the handle 904 having the jaw members 904a also moves the outwardly protruding extension 1101a of the elongate member 1101 vertically in an upward direction and a downward direction. The elongate member 1101 of the securing component 602 is moved in a downward direction to lock the allocated vehicle 203a by engaging the protruding element 1001 of the allocated vehicle 203a. The elongate member 1101 is moved in an upward direction towards the first hollow tubular member 1103 to unlock the allocated vehicle 203a by disengaging the protruding element 1001 of the allocated vehicle 203a. If there is no vehicle 203 at the securing component 602, the elongate member 1101 is set in the unlocked position, that is, the elongate member 1101 is disposed in the upward direction in the first hollow tubular member 1103. A magnet 1102 is provided on the top surface 1103a of the first hollow tubular member 1103 to hold the elongate member 1101 in the unlocked position.

The second inductive proximity sensor 906b on the locking unit 502 is aligned to the elongate member 1101 in the unlocked position, so that when there is no vehicle 203 at the securing component 602, the locking unit 502 while scanning can identify this securing component 602 by sensing the elongate member 1101 of the securing component 602. If there is a vehicle 203 at the securing component 602 and the elongate member 1101 is in a locked position, that is, the elongate member 1101 is disposed in the downward direction to engage the protruding element 1001 of the vehicle 203, the second inductive proximity sensor 906b cannot sense the elongate member 1101. The third inductive proximity sensor 906c is therefore aligned with the protruding element 1001 of the vehicle 203 to sense the elongate member 1101 in the locked position.

The protruding element 1001 that is fixed to the vehicle 203 engages with the securing component 602 and is locked by the locking unit 502, when the vehicle 203 is parked in the docking station 202. The protruding element 1001 is fixed in front of the vehicle 203 so that the user can easily push the protruding element 1001 into the securing socket 602a of the securing component 602 while returning the vehicle 203. When a vehicle 203 is returned to the docking station 202, the elongate member 1101 of the locking unit 502 is slid into the protruding element 1001 and is firmly locked and held. The securing component 602 further comprises a second hollow tubular member 1104 disposed at the bottom of the securing component 602. The second hollow tubular member 1104 supports the elongate member 1101 when the elongate member 1101 is in the locked position. When there is a vehicle 203 at the securing component 602 and the elongate member 1101 is in the locked position, the third inductive proximity sensor 906c senses the protruding element 1001 on the vehicle 203 and identifies the securing component 602.

In order to identify at which securing component 602 the latest vehicle 203 arrived and waits to be locked, output of the second inductive proximity sensor 906b and the third inductive proximity sensor 906c are used. The second inductive proximity sensor 906b outputs a signal if the elongate member 1101 is in the unlocked position. The third inductive proximity sensor 906c outputs a signal if the protruding element 1001 of the vehicle 203 is inside the securing socket 602a of the securing component 602. Therefore, when the second inductive proximity sensor 906b and the third inductive proximity sensor 906c output signals, it is determined that a vehicle 203 has arrived and is waiting to be locked at the securing component 602. On detecting this condition, the locking unit 502 stops at that securing component 602 to receive the outwardly protruding extension 1101a in the space 904b between the jaw members 904a. The alignment of the jaw members 904a of the handle 904 is performed prior to the initiation of movement of the locking unit 502 from the default position. The second drive mechanism 907, for example, the geared motor is then rotated to drive the elongate member 1101 downwards to lock the vehicle 203 by engaging the inserted protruding element 1001 of the vehicle 203. The client component 503 receives the vehicle identifier broadcasted by the vehicle control unit 501 of the vehicle 203 and the identifier of the securing component 602 sent by the locking unit 502 after locking the vehicle 203. When the vehicle 203 is locked, the client component 503 transmits the vehicle identifier and the determined position identified by the identifier of the registered docking station 202 and the identifier of the securing component 602 where the vehicle 203 is parked, to the central server 204.

The locking unit 502 identifies each securing component 602 by monitoring the output of the second inductive proximity sensor 906b and the third inductive proximity sensor 906c. For example, if the vehicle 203 is secured to the docking station 202 by engagement of the protruding element 1001 of the vehicle 203, the third inductive proximity sensor 906c is in close proximity to the protruding element 1001 as exemplarily illustrated in FIG. 11. Thus, the third inductive proximity sensor 906c reports a high signal to the microcontroller 502a of the locking unit 502. In the same scenario, the second inductive proximity sensor 906b is not in close proximity to the outwardly protruding extension 1101a of the elongate member 1101 of the securing component 602, as the outwardly protruding extension 1101a is pushed down by the handle 904 during the locking process and therefore reports a low signal to the microcontroller 502a of the locking unit 502. The combination of the low signal from the second inductive proximity sensor 906b and a high signal from the third inductive proximity sensor 906c indicates that a vehicle 203 has been engaged and locked at the securing component 602.

In a second scenario, if there is a vehicle 203 parked at the securing component 602 but not locked yet, then the outwardly protruding extension 1101a of the elongate member 1101 is in close proximity to the second inductive proximity sensor 906b and the protruding element 1001 of the vehicle 203 is also in close proximity to the third inductive proximity sensor 906c. The combination of the high signals from the second inductive proximity sensor 906b and the third inductive proximity sensor 906c indicates that the vehicle 203 has just been returned to the docking station 202 and needs to be engaged.

In the third scenario, if there is no vehicle 203 docked at the securing component 602, then the elongate member 1101 is in the unlocked position and hence the outwardly protruding extension 1101a of the elongate member 1101 in close proximity to the second inductive proximity sensor 906b. The second inductive proximity sensor 906b therefore reports a high signal to the microcontroller 502a of the locking unit 502. The third inductive proximity sensor 906c reports a low signal since there is no protruding element 1001 of the vehicle 203 inserted at that securing component 602. The combination of the high signal from the second inductive proximity sensor 906b and the low signal from the third inductive proximity sensor 906c indicates that there is no vehicle 203 docked at the securing component 602. The status of the inductive proximity sensors 906b and 906c changes only when the locking unit 502 reaches the securing component 602, thus the locking unit 502 can sense each time the vehicle 203 crosses the securing component 602 and keep track of the vehicle's 203 position every time.

Since the second inductive proximity sensor 906b or the third inductive proximity sensor 906c outputs a signal depending on the status of the securing component 602, the locking unit 502 determines the identifier of the securing component 602 by counting the number of securing components 602 crossed before reaching the required securing component 602. When a request for a vehicle 203 is made, the client component 503 requests the vehicle control units 501 in each of the secured vehicles 203 to return their charge levels. The client component 503 determines the vehicle 203 with the highest charge level or battery life and transmits the vehicle identifier and an "unlock signal" to the locking unit 502. The locking unit 502 then locates the vehicle 203. In an embodiment, the client component 503 requests the central server 204 for the vehicle's 203 position. The client component 503 then sends the position and the unlock signal to the locking unit 502. The locking unit 502 then travels to the determined position and unlocks the vehicle 203 by moving the elongate member 1101 of the locking unit 502 vertically in the upward direction.

The handle 904 with the jaw members 904a moves downwards to perform a locking operation and moves upwards to perform an unlocking operation. The locking unit 502 therefore positions the jaw members 904a of the handle 904 and therefore the elongate member 1101 with the outwardly extending protrusion in the locked position or the unlocked position prior to performing the unlocking operation and the locking operation. Since there is no room for repositioning the jaw members 904a when the locking unit 502 is moving, the jaw members 904a are positioned based on the signal received from the client component 503 when the locking unit 502 is in its default position. After being positioned, the locking unit 502 starts moving towards the securing component 602.

Figure 12:
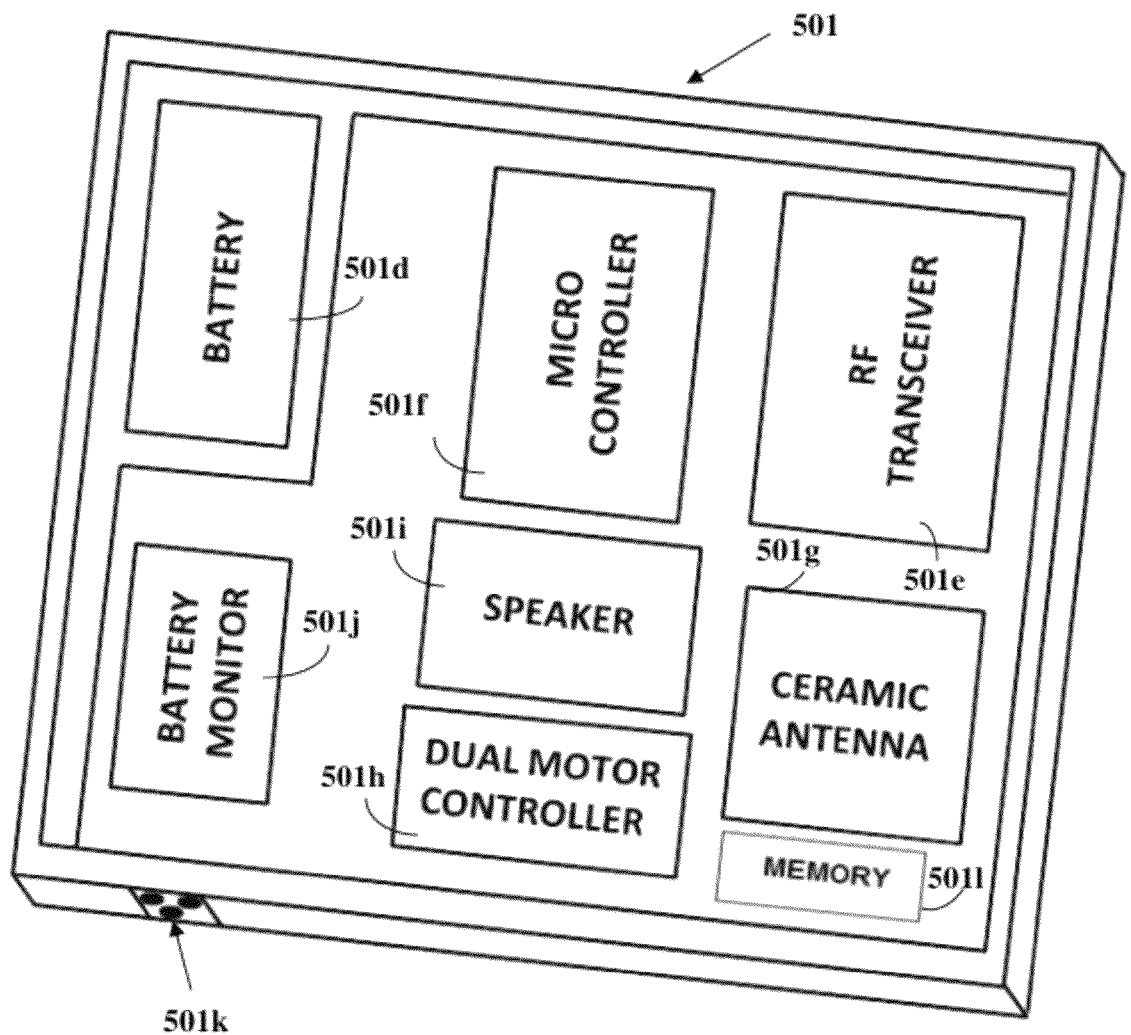
FIG. 12 exemplarily illustrates a vehicle control unit.

FIG. 12 exemplarily illustrates a vehicle control unit 501. The vehicle control unit 501 comprises a microcontroller 501f, an RF transceiver 501e, a ceramic antenna 501g, a speaker 501i, a dual motor controller 501h, a battery 501d, a battery monitor 501j, a memory 501l, and a charging socket 501k.

The battery 501d powers the components, for example, 501e, 501f, etc., of the vehicle control unit 501. The battery 501d is, for example, a 12-volt lithium-ion rechargeable battery. The 12-volt lithium-ion rechargeable battery when fully charged provides power supply for more than 10 hours. The charging units 509 at the docking stations 202 charge the battery 501d of the vehicle control unit 501 of each of the vehicles 203. The client component 503 allocates the vehicle 203 with the highest charged battery 501d to the user, thereby reducing the possibility of the vehicle 203 running out of charge while being used.

The RF transceiver 501e in the vehicle control unit 501 enables wireless data communication with the boundary units 201, the docking stations 202, and the central server 204. The RF transceiver 501e transmits and receives signals in a frequency range of about 2.4 gigahertz (GHz) and supports, for example, the Zigbee® protocol. The RF transceiver 501e uses the frequency range of, for example, about 2.4 GHz. Moreover, the RF transceiver 501e used in the frequency range of 2.4 GHz has a built-in support for collision avoidance, retries, and acknowledgements. The RF transceiver 501e is, for example, an XBee® embedded RF unit. The XBee® embedded RF unit provides wireless connectivity to end-point devices in Zigbee® mesh networks. Setting up a network using the XBee® embedded RF unit does not require any configuration or additional development. The Zigbee® RF transceiver 501e provides a separate dedicated microcontroller which takes care of noise filtering, routing, and polling and functions independently from the microcontroller 501f in the vehicle control unit 501. The Zigbee® RF transceiver 501e also has an independent protocol stack. This independent protocol stack eases memory consumption of main memory 501l of the vehicle control unit 501 and leaves the microcontroller 501f free to do its own processing without worrying about data transfer and polling.

The microcontroller 501f in the vehicle control unit 501 is a microcontroller that can communicate with the RF transceiver 501e. The microcontroller 501f supports a power-saver mode or a sleep mode during which battery consumption is minimum, for example, as low as a few microamperes, to save power and increase the battery life of the vehicle control unit 501. The microcontroller 501f is, for example, Atmel® ATmega128RFA1 of Atmel Corporation, Jennic® JN5148 of Jennic Ltd., etc. The Atmel® ATmega128RFA1 and the Jennic® JN5148 are microcontrollers that have an inbuilt RF transceiver 501e. In an embodiment, the microcontroller 501f and the RF transceiver 501e are integrated on a single chip to reduce the size of the entire component.

The ceramic antenna 501g in the vehicle control unit 501 increases the communication range of the RF transceiver 501e to over four kilometers in an open field environment. The ceramic antenna 501g covers a communication range of over 500 meters in crowded environments dominated with buildings and trees that cause a lot of obstruction for wireless communication. Though the RF transceiver 501e provides a range of about 70-100 meters in an open field environment with no obstructions, the signal strength drops each time the signal passes through an obstruction. The ceramic antenna 501g overcomes a drop in signal strength and thus increases the communication range. The ceramic antenna 501g is specifically used due to its small form factor.

The dual motor controller 501h is an integrated circuit (IC) that drives motors requiring external power and that cannot be powered by internal power supplied by the microcontroller 501f alone. The dual motor controller 501h acts as a switch for the external battery 501d. The microcontroller 501f operates the dual motor controller 501h to supply extra external power to a disabling unit 1402 in the vehicle 203. When an attempt to breach the defined boundary 205 is detected, the microcontroller 501f instructs the dual motor controller 501h to activate the brake actuator 1402b and the lock actuator 1402c of the disabling unit 1402. The dual motor controller 501h in-turn routes the power from the battery 501d to the brake actuator 1402b and the lock actuator 1402c.

The speaker 501i, in communication with the speed monitoring and alerting module 501b of the vehicle control unit 501, is a low wattage speaker 501i that generates sounds, for example, beeps, loud enough to be audible to a user using an allocated vehicle 203a. The sounds made by the speaker 501i alert the user when the allocated vehicle 203a is in the proximity of the defined boundary 205. In an embodiment, the speaker 501i generates sounds when the allocated vehicle 203a is running out of charge, and after the allocated vehicle 203a is successfully returned to a docking station 202. At each of these occasions, the speaker 501i makes different sounds that are pre-trained to the user.

The battery monitor 501j monitors the charge in the battery 501d regularly when the allocated vehicle 203a is in use. The charge in the battery 501d determines the battery life of the vehicle control unit 501. More the charge, higher is the battery life. When the battery life drops below a threshold value, for example, 30 minutes battery life, the microcontroller 501f sends instructions to the user to return the allocated vehicle 203a to the nearest docking station 202 and take another vehicle 203 if required, by means of a unique beep sound generated through the speaker 501i. If the user fails to return the allocated vehicle 203a to the docking station 202 before the battery life drops below a critical value, for example, 1 minute, the microcontroller 501f instructs the disabling unit 1402 to disable the allocated vehicle 203a. The microcontroller 501f then notifies the central server 204. Moreover, the battery monitor 501j monitors the battery life of the vehicle 203 when the vehicle 203 is parked in a docking station 202. When the client component 503 requests the vehicle control unit 501 to return the battery life of the vehicle 203 for allocating the vehicle 203 to the user, the battery monitor 501j returns the status of the battery life of the vehicle 203 to the client component 503.

A charging socket 501k is provided on the vehicle control unit 501 for enabling charging of the battery 501d of the vehicle control unit 501 using the charging unit 509 when the vehicle 203 is parked in the docking station 202. The retractable charging cable 509a of the charging unit 509 in the docking station 202 can be pulled out and plugged into the charging socket 501k of the vehicle control unit 501.

Figure 13:
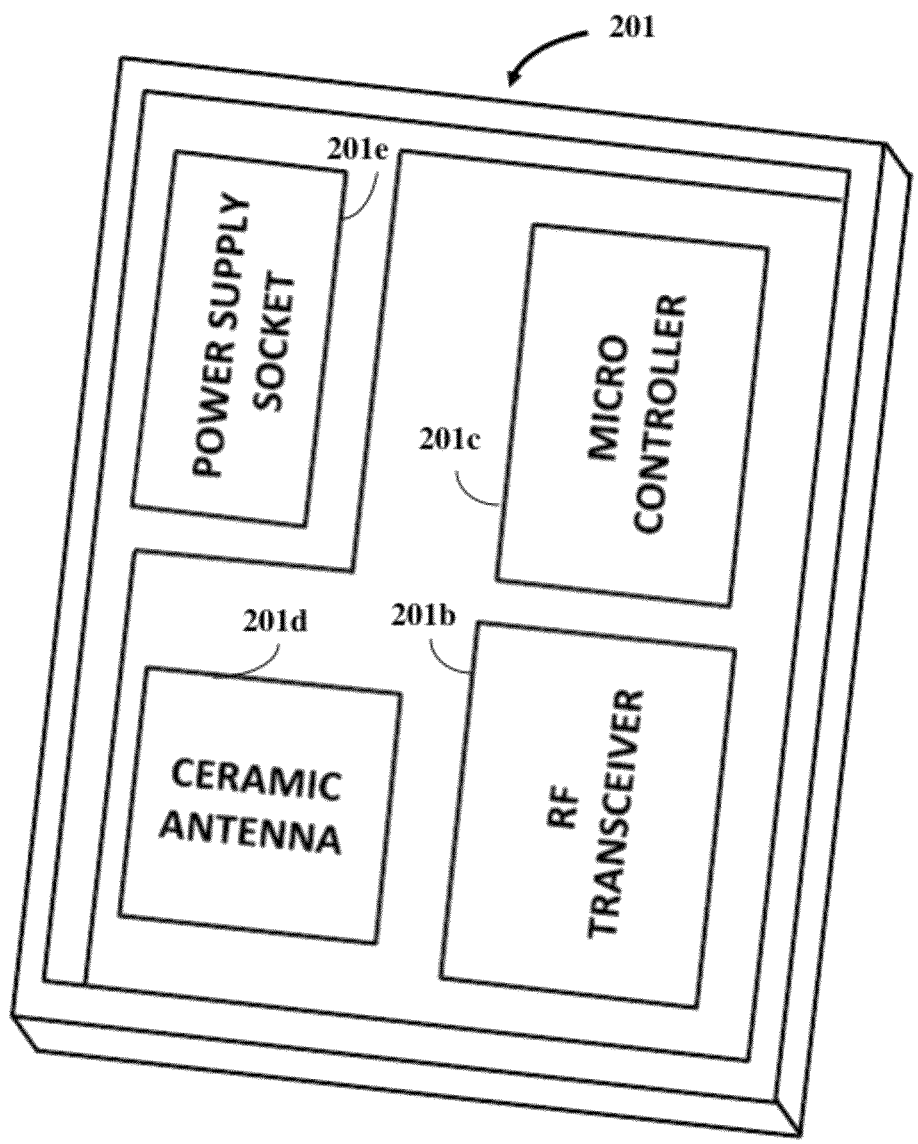
FIG. 13 exemplarily illustrates a boundary unit.

FIG. 13 exemplarily illustrates a boundary unit 201. The boundary unit 201 comprises a power supply socket 201e, a microcontroller 201c, a radio frequency (RF) transceiver 201b, and a ceramic antenna 201d. The RF transceiver 201b enables wireless data communication with the vehicle control unit 501 and between neighboring boundary units 201. The wireless data communication between the boundary unit 201 and the vehicle control unit 501 predominantly involves computation of the proximity of allocated vehicle 203a to the defined boundary 205. The wireless data communication between the boundary unit 201 and the neighboring boundary units 201 is forwarding data regarding breaching of the defined boundary 205 by the allocated vehicle 203a. The boundary units 201 form a chain link in which each boundary unit 201 transmits information that it receives from the preceding boundary unit 201 along the chain link to the boundary unit 201 installed right after it. This process continues until the information reaches the boundary unit 201 that directly connects this link to the central server 204. The RF transceiver 201b in each of the boundary units 201 enables wireless interconnection between them by generating routing tables containing the addresses of the neighboring boundary units 201. The RF transceiver 201b embeds the addresses of the neighboring boundary units 201 into the microcontroller 201c of each of the boundary units 201 to form a wireless communication network. The RF transceiver 201b forms the communication gateway between the boundary units 201. The boundary units 201 positioned at predetermined locations in a managing area 206 define a boundary 205 along a perimeter 206a of the managing area 206. Moreover, the boundary units 201 check for breach of the defined boundary 205 by the allocated vehicle 203a. The wireless communication network acts as a transmission line for linking the boundary units 201, the client component 503 in each of the docking stations 202, and the vehicle control unit 501 of each vehicle 203 to the central server 204. Therefore, the client component 503 and the vehicle control unit 501 transfer the data intended for the central server 204 through this wireless communication network.

The microcontroller 201c decodes the received data from the vehicle control unit 501 and the neighboring boundary units 201 and determines the next operation that the boundary unit 201 should perform. The ceramic antenna 201*d* in the boundary unit 201 increases the communication range 403 of the RF transceiver 201*b* to over four kilometers in an open field environment; this implies that the ceramic antenna 201*d* covers a communication range 403 of over 500 meters in crowded environments dominated with buildings and trees that cause a lot of obstruction for wireless communication. Furthermore, by varying the transmission power of the RF transceiver 201*b*, the transmission range and strength of transmission signals is varied for better accuracy and sensitivity of the received signal strength indicator (RSSI) values aiding in the implementation of the proximity calculation algorithm. The power supply socket 201*e* in the boundary unit 201 provides power to the components, for example, 201*b*, 201*c*, 201*d*, etc., of the boundary units 201. Since the boundary units 201 are wireless for all purposes other than the power supply, the power supply socket 201*e* is mounted on the nearest electric pole or hung onto a wall of a building without affecting the purpose and usage of the boundary unit 201.

FIG. 14 exemplarily illustrates a perspective view of the vehicle control unit 501 and a disabling unit 1402 mounted on a vehicle 203. The vehicle control unit 501 and the disabling unit 1402 are provided on each of the wheels 1403 of the vehicles 203. The vehicle control unit 501 is electrically connected to the disabling unit 1402, for example, via a hollow metal pipe 1401. The hollow metal pipe 1401 is part of the body frame of the vehicle 203. Moreover, the hollow metal pipe 1401 conceals the electrical connections between the vehicle control unit 501 and the disabling unit 1402; thereby protecting the electrical connections from damage by the environment, misuse, etc.

Figure 15:
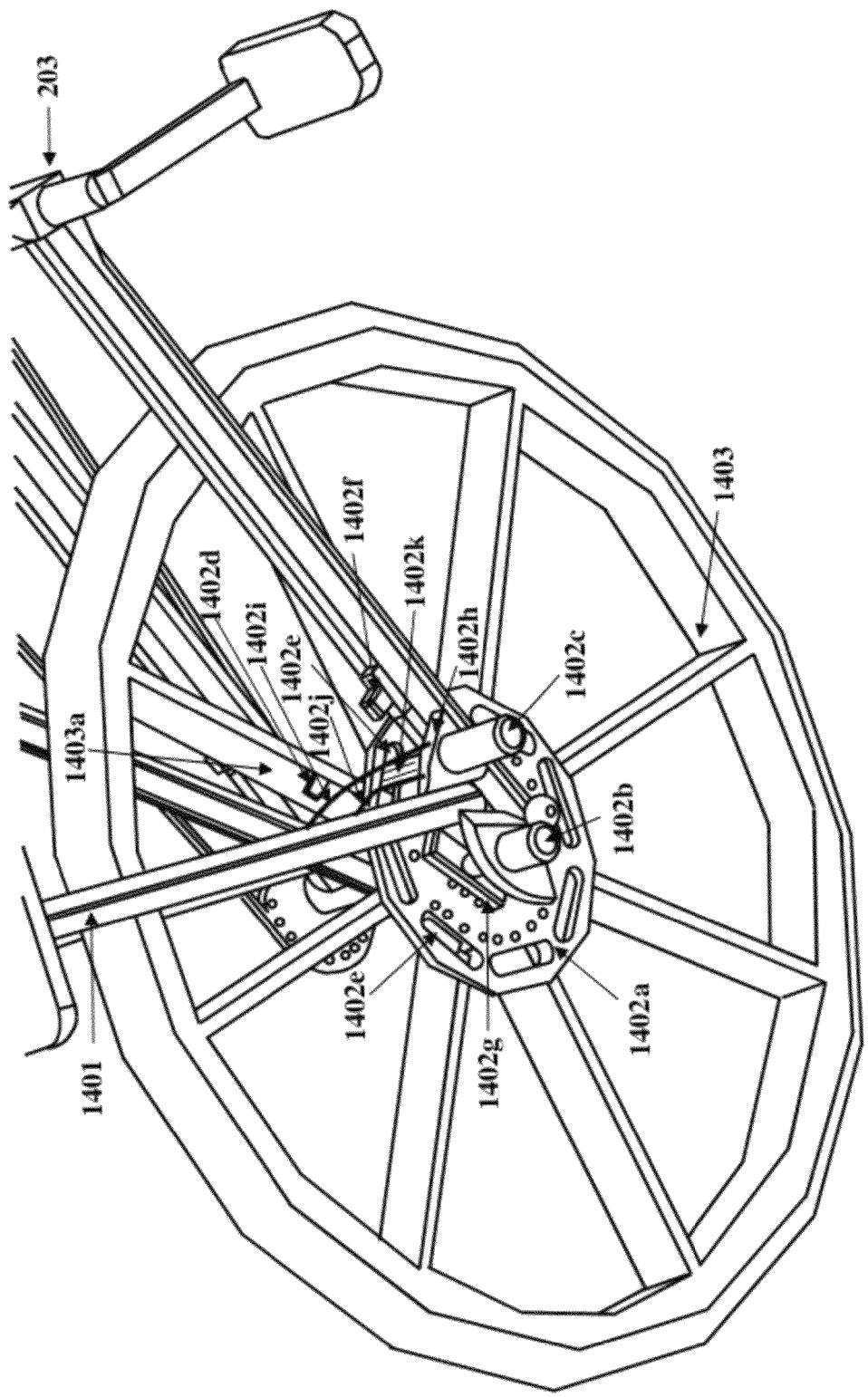
FIG. 15 exemplarily illustrates a perspective view of a disabling unit operably connected to a wheel of a vehicle.

FIG. 15 exemplarily illustrates a perspective view of a disabling unit 1402 operably connected to a wheel 1403 of a vehicle 203. In an embodiment, the disabling unit 1402 comprises a disc 1402*a*, a brake actuator 1402*b*, a lock actuator 1402*c*, a permanent magnet 1402*d*, a metal rod 1402*k*, and a Hall-effect sensor 1402*f*. The disc 1402*a* has perforations 1402*e* and is fitted parallel to the wheel 1403, to a rear wheel axle of the vehicle 203 on the same axis. Therefore, the rotation of the wheel 1403 is reflected on the disc 1402*a* as well. Therefore, by controlling the rotation of the disc 1402*a*, the rotation of the wheel 1403 is restricted. The brake actuator 1402*b* is coupled to a rubber pad 1402*g*. When the disabling module 501*c* of the vehicle control unit 501 activates the brake actuator 1402*b*, the rubber pad 1402*g* is pushed against the disc 1402*a* for braking the wheel 1403 and therefore reducing the speed of the vehicle 203.

The Hall-effect sensor 1402*f* constantly monitors the speed of the vehicle 203. The Hall-effect sensor 1402*f* is a transducer that varies its output voltage in response to changes in a magnetic field. The permanent magnet 1402*d* is attached to one of spokes 1403*a* of the wheel 1403. The output voltage varies each time the permanent magnet 1402*d* passes the Hall-effect sensor 1402*f*. The vehicle control unit 501 detects the speed of the vehicle 203 by calculating the number of times the output voltage varies per unit time. The disabling module 501*c* of the vehicle control unit 501 activates the lock actuator 1402*c* when the speed of the vehicle 203 is detected to be zero, that is, when the vehicle 203 is completely stopped. The metal rod 1402*k* coupled with the lock actuator 1402*c* is pushed into the perforations 1402*e* in the disc 1402*a*, locking the wheels 1403, and disabling the vehicle 203 from further movement. In an embodiment, the brake actuator 1402*b* and the lock actuator 1402*c* can be driven, for example, by energized solenoid actuators or high torque-low revolutions per minute (RPM) electric motors. The high torque of the electric motors or the magnetic action of the solenoid actuators maintains the wheels 1403 of the vehicle 203 in the locked position by pushing the head of the lock actuator 1402*c* into the perforations 1402*e* of the disc 1402*a*, thereby locking the wheels 1403 of the vehicle 203 even after the current signal to drive them is cut off, and preventing unlocking of the vehicle 203.

In an embodiment, the vehicle control unit 501 detects auxiliary movement of the disabled vehicle 203*b* after the locking and disabling. That, is, when the user intends to steal the disabled vehicle 203*b*, for example, by carrying the disabled vehicle 203*b*, the vehicle control unit 501 which is still in communication with the boundary units 201, registers any further change in the proximity of the disabled vehicle 203*b* compared to the proximity values that the vehicle control unit 501 calculated at the instance of disabling the vehicle 203. Any change in the proximity of the disabled vehicle 203*b* triggers the speed monitoring and alerting module 501*b* of the vehicle control unit 501 which then notifies the central server 204 with a high priority signal that indicates an urgent need for attention. The high priority signal also contains the vehicle identifier of the disabled vehicle 203*b*.

In an embodiment, the vehicle management system 200 further prevents theft of the disabled vehicle 203*b* by separating the vehicle control unit 501 from the disabled vehicle 203*b*. A voltage high line 1402*i* is connected from a +Vcc pin of the microcontroller 501*f* in the vehicle control unit 501 to the disabling unit 1402. The free end of the voltage high line 1402*i* is connected to one end of a metal strip 1402*h* mounted on the body of the disabling unit 1402. The other end of the metal strip 1402*h* is soldered to another wire 1402*j* whose free end is fed as input to the microcontroller 501*f* in the vehicle control unit 501. In a normal sequence, the voltage high line 1402*i* passes the voltage corresponding to digital 1 in the circuitry of the microcontroller 501*f* to the metal strip 1402*h* continuously. The wire 1402*j* soldered to the other end of this metal strip 1402*h* carries the same signal as input to the microcontroller 501*f*. Therefore, as long as the vehicle control unit 501 stays mounted on the disabled vehicle 203*b*, this path is complete and the microcontroller 501*f* always reads a logic 1 at the input line that the second wire 1402*j* is connected to. If the vehicle control unit 501 is separated from the disabled vehicle 203*b* or if one of these wires 1402*i* or 1402*j* completing the path are broken, it results in logic 0 at the input to the microcontroller 501*f*. The microcontroller 501*f* upon sensing the logic 0 at its input broadcasts a "breach signal" with the vehicle identifier. Moreover, the speed monitoring and alerting module 501*b* of the vehicle control unit 501 also sounds alarms to alert persons or security around the managing area 206. In an example, the speed monitoring and alerting module 501*b* is configured to play a recording indicating that the user is stealing the vehicle 203.

The breach signal broadcasted by the vehicle control unit 501 after the vehicle 203 is disabled, appends a source indication value in the breach signal. The source indication value identifies the boundary unit 201 that picks up the breach signal directly from the vehicle control unit 501. The vehicle control unit 501 prior to initiating this broadcast equates the value of the source indication value to 0 and embeds the source indication value as part of the broadcast data packet's payload. The boundary unit 201 that first picks up this data packet checks the value of the source indication value. If the source indication value is 0, the boundary unit 201 understands that it is the first recipient boundary unit 201, changes the value of the source indication value to 1, and appends its own unique identifier as part of the payload. It should be noted that only a boundary unit 201 is authorized to change the source indication value of the breach signal for identifying the last known location of the vehicle control unit 501 with respect to the first boundary unit 201 which detected the breach signal, and it is not necessary that this boundary unit 201 is actually the first boundary unit 201 to receive the broadcasted breach signal directly from its originator. Each of the boundary units 201 is static in nature and hence used as a positional reference. The intermediate boundary units 201 then act as repeater nodes and complete the broadcasting procedure without altering the source indication value.

When the central server 204 receives the broadcasted breach signal, the central server 204 retrieves the unique identifier of the boundary unit 201 that first received the breach signal in the broadcast process and notifies the system administrator of the location of the boundary unit 201 being the last known location of the stolen vehicle 203. This process continues until the vehicle control unit 501 stays in the transmission range of at least one of the boundary units 201 in the communication network 510 to form a link to the central server 204 to transmit the continuously generated breach signal.

Figure 16:
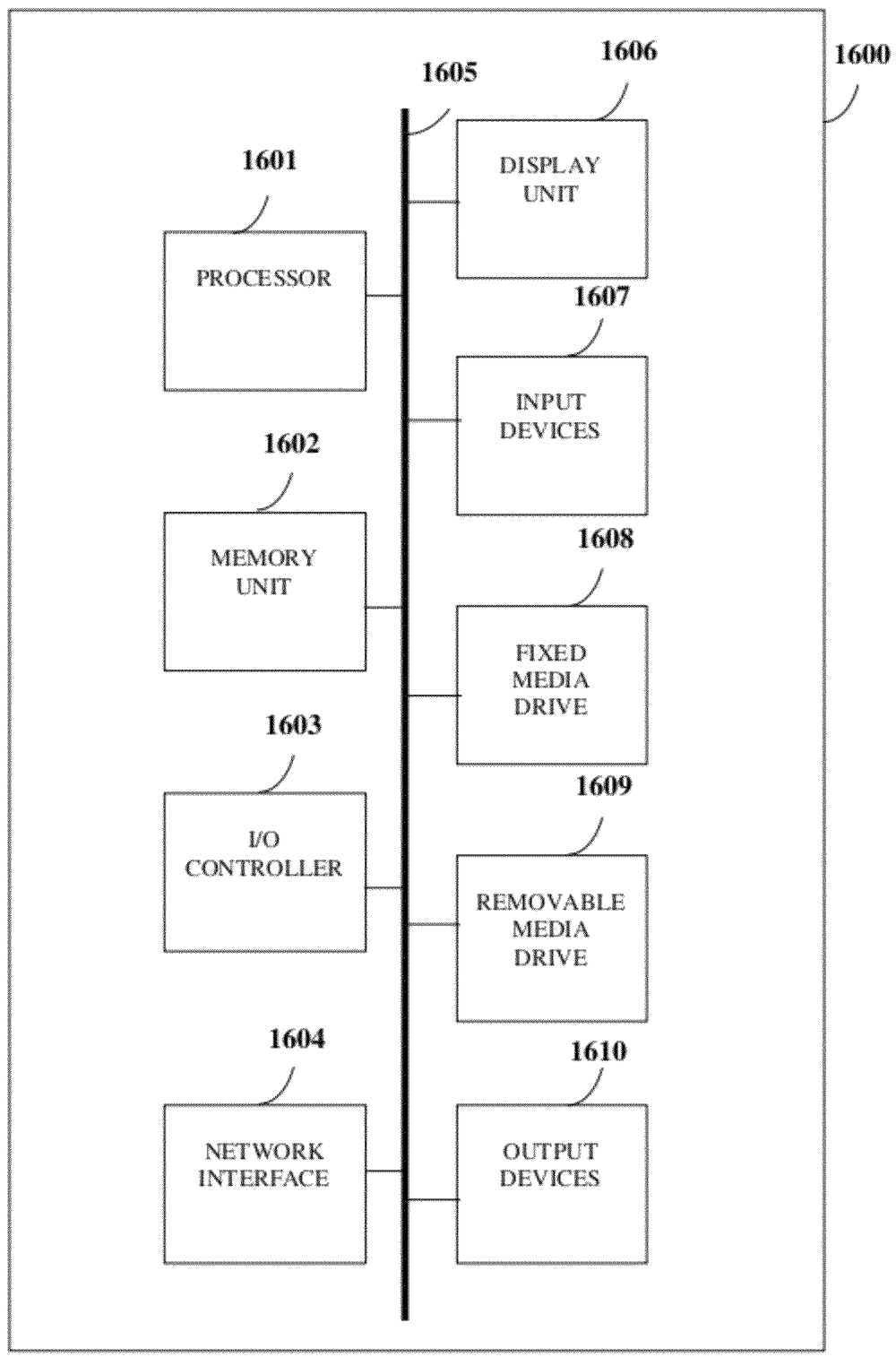
FIG. 16 exemplarily illustrates the architecture of a computer system employed by a central server of the vehicle management system for managing multiple vehicles within a boundary.

FIG. 16 exemplarily illustrates the architecture of a computer system 1600 employed by the central server 204 of the vehicle management system 200 for managing multiple vehicles 203 within a boundary 205. In an embodiment, the client component 503 and the central server 204 employ the architecture of the computer system 1600 exemplarily illustrated in FIG. 16.

The boundary units 201, the docking stations 202, and the vehicle control unit 501 communicate with the central server 204 via a short range communication network 510 or a long range communication network 510. The client component 503 also communicates with the central server 204 via the communication network 510. The communication network 510 is, for example, a local area network (LAN), a wide area network, a mobile communication network, etc. The computer system 1600 comprises, for example, a processor 1601, a memory unit 1602 for storing programs and data, an input/output (I/O) controller 1603, a network interface 1604, a data bus 1605, a display unit 1606, input devices 1607, a fixed media drive 1608, a removable media drive 1609, output devices 1610, etc.

The processor 1601 is an electronic circuit that executes computer programs. The memory unit 1602 is used for storing programs, applications, and data. For example, the modules 505, 506, etc., of the client component 503 are stored in the memory unit 1602 of the computer system 1600 employed by the client component 503. The modules 204a, 204c, 204f, etc., of the central server 204 are stored in the memory unit 1602 of the computer system 1600 employed by the central server 204. The memory unit 1602 is, for example, a random access memory (RAM) or another type of dynamic storage device that stores information and instructions for execution by the processor 1601. The memory unit 1602 also stores temporary variables and other intermediate information used during execution of instructions by the processor 1601. The computer system 1600 further comprises a read only memory (ROM) or another type of static storage device that stores static information and instructions for the processor 1601. The network interface 1604 enables connection of the computer system 1600 to the communication network 510. The computer system 1600 of the central server 204 communicates with the boundary units 201, the client component 503 of each of the docking stations 202, and the vehicle control unit 501 through the network interface 1604. The computer system 1600 of the client component 503 communicates with the central server 204 through the network interface 1604.

The network interface 1604 comprises, for example, a Bluetooth™ interface, an infrared (IR) interface, a WiFi interface, a universal serial bus interface (USB), a local area network (LAN) interface, a wide area network (WAN) interface, etc. The I/O controller 1603 controls the input and output actions performed by a system administrator of the central server 204. The data bus 1605 of the central server 204 permits communications between the modules, for example, 204a, 204c, 204e, 204f, etc., of the central server 204. The data bus 1605 of the client component 503 permits communications between the modules, for example, 505, 506, etc., of the client component 503.

The display unit 1606 displays, via a graphical user interface (GUI), the results computed by the central server 204 to the system administrator. For example, the display unit displays the location of an allocated vehicle 203a that breached the defined boundary 205 as a position on a map 2100 displayed on the GUI of the display unit 1606. The input devices 1607 are used for inputting data into the computer system 1600. The input devices 1607 are, for example, a keyboard such as an alphanumeric keyboard, a joystick, a mouse, a touch pad, a light pen, etc.

The computer system 1600 further comprises a fixed media drive 1608 and a removable media drive 1609 for receiving removable media. Computer applications and programs are used for operating the computer system 1600. The programs are loaded onto the fixed media drive 1608 and into the memory unit 1602 of the computer system 1600 via the removable media drive 1609. In an embodiment, the computer applications and programs may be loaded directly via the communication network 510. Computer applications and programs are executed by double clicking a related icon displayed on the display unit 1606 using one of the input devices 1607.

The computer system 1600 employs an operating system for performing multiple tasks. The operating system is responsible for the management and coordination of activities and the sharing of the resources of the computer system 1600. The operating system further manages security of the computer system 1600, peripheral devices connected to the computer system 1600, and network connections. The operating system employed by the central server 204 recognizes, for example, signals received from the client component 503 on each of the docking stations 202 and the boundary units 201, the output display, files, and directories stored locally on the fixed media drive 1608, for example, a hard drive. The operating system on the central server 204 executes different programs, for example, the billing module 204e, initiated by the system administrator using the processor 1601. The processor 1601 retrieves the instructions for executing each of the modules, for example, 204a, 204c, 204e, 204f, etc., of the central server 204 and the modules, for example, 505, 506, etc., of the client component 503 from an associated program memory in the form of signals. A program counter determines the location of the instructions in the program memory. The program counter stores a number that identifies the current position in the program of the modules, for example, 204a, 204c, 204e, 204f, etc., of the central server 204 and the modules, for example, 505, 506, etc., of the client component 503.

The instructions fetched by the processor 1601 from the program memory after being processed are decoded. The instructions are placed in an instruction register in the processor 1601. After processing and decoding, the processor 1601 executes the instructions. For example, the registration module 204a defines instructions for registering the user, the vehicles 203, the docking stations 202, and the boundary units 201 and associating identifiers with the user, the vehicles 203, the docking stations 202, and the boundary units 201. The verification module 204c defines instructions for verifying identification information received from the user via the communication interface 504 provided by the client component 503. The location determination module 204f defines instructions for determining location of the allocated vehicle 203a, when the allocated vehicle 203a is in close proximity to or breaches the defined boundary 205. The billing module 204e defines instructions for generating billing information for the user based on usage statistics logged by the database 204b.

The processor 1601 executes instructions defined by the modules, for example, 505, 506, etc., of the client component 503. For example, the authorization module 505 defines instructions for authorizing the user prior to the allocation of one of the vehicles 203 to the user. The allocation module 506 defines instructions for allocating one of the vehicles 203 from one of the docking stations 202 in communication with the central server 204 to the user based on allocation criteria.

The processor 1601 of the central server 204 retrieves the instructions defined by the registration module 204a, the verification module 204c, the location determination module 204f, and the billing module 204e, and executes the instructions. The processor 1601 of the client component 503 retrieves the instructions defined by the authorization module 505 and the allocation module 506, and executes the instructions.

At the time of execution, the instructions stored in the instruction register are examined to determine the operations to be performed. The processor 1601 then performs the specified operations. The operations include arithmetic and logic operations. The operating system performs multiple routines for performing a number of tasks required to assign the input devices 1607, the output devices 1610, and memory for execution of the modules, for example, 204a, 204c, 204e, 204f, etc., of the central server 204 and the modules, for example, 505, 506, etc., of the client component 503. The tasks performed by the operating system comprise assigning memory to the modules, for example, 204a, 204c, 204e, 204f, etc., of the central server 204 and the modules, for example, 505, 506, etc., of the client component 503 and data, moving data between the memory unit 1602 and disk units, and handling input/output operations. The operating system performs the tasks on request by the operations and after performing the tasks, the operating system transfers the execution control back to the processor 1601. The processor 1601 continues the execution to obtain one or more outputs. The outputs of the execution of the modules, for example, 204a, 204c, 204e, 204f, etc., of the central server 204 are displayed to the system administrator. The outputs of the execution of the modules, for example, 505, 506, etc., of the client component 503 are displayed to the user.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disk, volatile media such as a register memory, processor cache, etc., and transmission media such as wires that comprise a system bus coupled to the processor 1601, except for a transitory, propagating signal.

The computer program product disclosed herein comprises multiple computer program codes for managing multiple vehicles 203 within a defined boundary 205. The computer program product disclosed herein comprises a first computer program code for receiving identification information of multiple users, vehicles 203, docking stations 202, and boundary units 201 for registering the users, the vehicles 203, the docking stations 202, and the boundary units 201 respectively. The computer program product disclosed herein further comprises a second computer program code for verifying identification information received from the user for enabling allocation of one of the vehicles 203 from one of the docking stations 202 to the user, and a third computer program code for determining location of the allocated vehicle 203a in communication with the boundary units 201, when the allocated vehicle 203a is in close proximity to or breaches a boundary 205 defined by the boundary units 201. The computer program product disclosed herein further comprises a fourth computer program code for logging usage statistics of the allocated vehicle 203a in communication with each of the docking stations 202, the vehicle control unit 501, and the boundary units 201, and a fifth computer program code for generating billing information for the user based on the logged usage statistics. In an embodiment, a single piece of computer program code comprising computer executable instructions performs one or more steps of the computer implemented method disclosed herein for managing multiple vehicles 203 within the defined boundary 205.

The computer program codes comprising the computer executable instructions for managing multiple vehicles 203 within the defined boundary 205 are embodied in the non-transitory computer readable storage medium. The processor 1601 of the computer system 1600 retrieves these computer executable instructions and executes them. When the computer executable instructions embodied in the non-transitory computer readable storage medium are executed by the processor 1601, the computer executable instructions cause the processor 1601 to perform the method steps for managing multiple vehicles 203 within the defined boundary 205.

Figure 17:
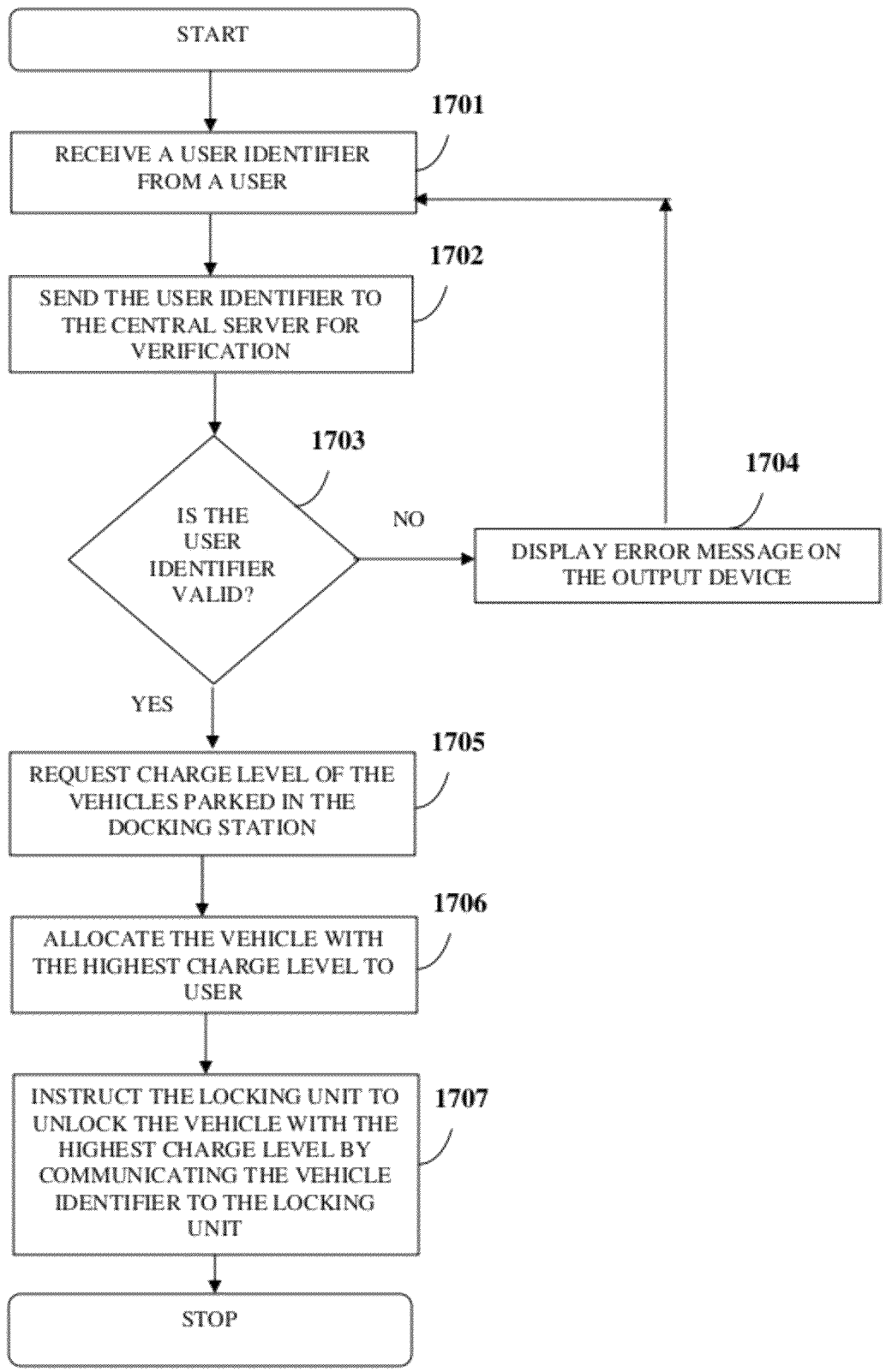
FIG. 17 exemplarily illustrates a flow chart comprising steps for allocating a vehicle to a user.

FIG. 17 exemplarily illustrates a flow chart comprising steps for allocating a vehicle 203 to a user. A user, who wishes to use a vehicle 203 for commute, approaches the docking station 202 nearest to the user. The client component 503 in the docking station 202, in communication with the central server 204, authorizes and allocates a vehicle 203 to the user. The user initiates the process, by pressing the push button on the keypad 504c of the communication interface 504, thus indicating to the client component 503 that a vehicle 203 parked and secured in the docking station 202 needs to be allocated to the user. The client component 503 then requests the user for the user identifier. The client component 503 receives 1701 the user identifier from the user via the communication interface 504. The client component 503 sends 1702 the received user identifier to the central server 204 via the communication network 510 for verification. The central server 204 checks 1703 whether the user identifier is valid. If the user identifier is not valid, the central server 204 notifies the client component 503. The client component 503 then displays 1704 an error message on an output device 504b, for example, an LCD screen on the communication interface 504 conveying that the user identifier provided by the user is not valid. The client component 503 then provides the user an option to provide the user identifier again.

If the central server 204 verifies that the user identifier provided by the user is valid, then the client component 503 requests 1705 the vehicles 203 parked and secured in the docking station 202 to return their charge levels. After comparing the charge levels of the vehicles 203, the client component 503 allocates 1706 the vehicle 203 with the highest charge level to the user. The client component 503 then instructs 1707 the locking unit 502 to unlock the vehicle 203 with the highest charge level by communicating the vehicle identifier to the locking unit 502. The locking unit 502 slides along the support structure 601 in the docking station 202 and scans the RFID tags mounted on the protruding element 1001 of each of the parked and secured vehicles 203 and locates the vehicle 203 whose RFID tag matches with the vehicle identifier communicated to the locking unit 502 by the client component 503. The locking unit 502 unlocks the allocated vehicle 203a by disengaging the allocated vehicle 203a from the securing component 602 as disclosed in the detailed description of FIG. 11. The allocated vehicle 203a can now be used by the user within the managing area 206.

Figure 18A:
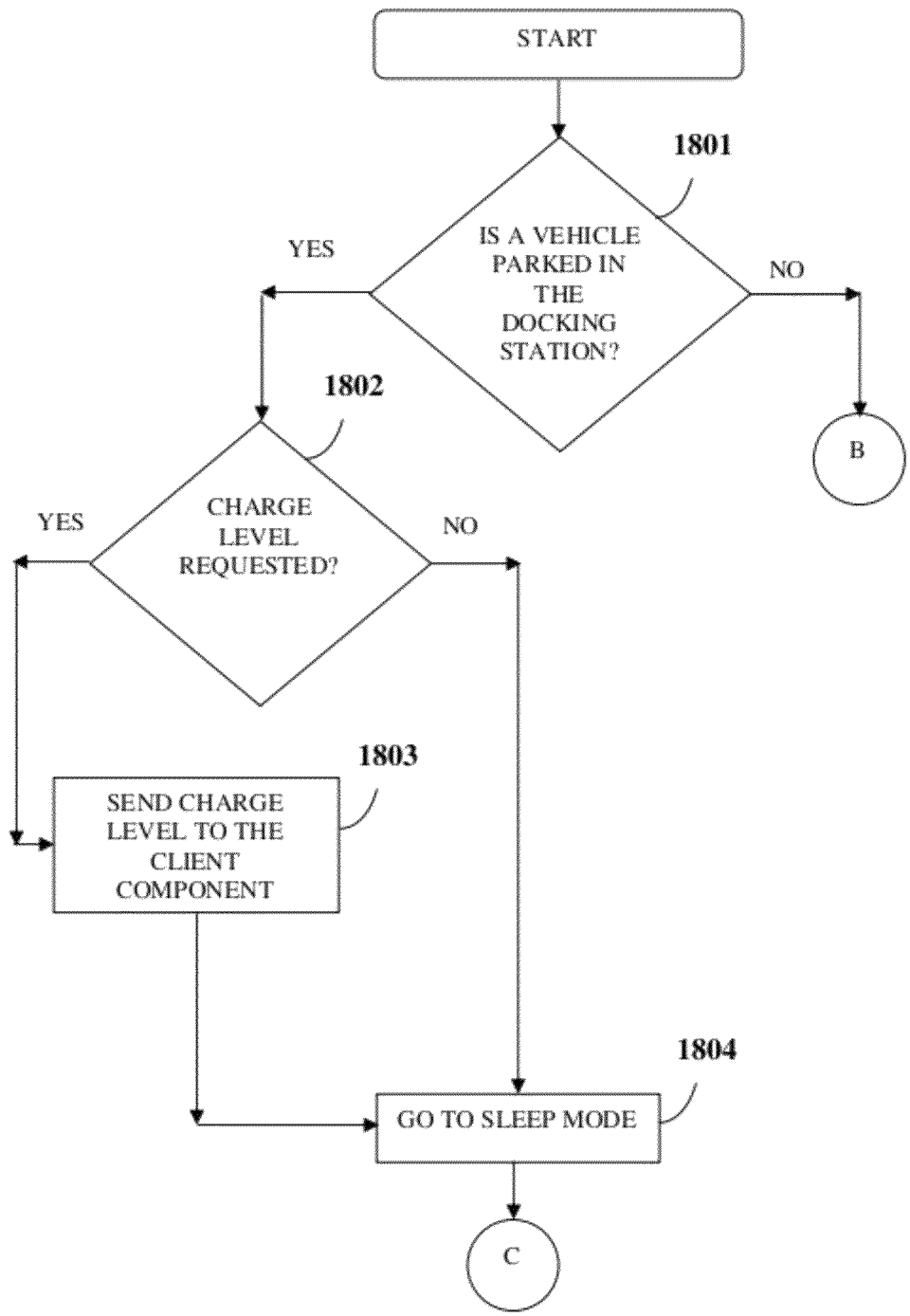
FIGS. 18A-18B exemplarily illustrate a flow chart comprising steps for determining a breach of a defined boundary by an allocated vehicle.
Figure 18B:
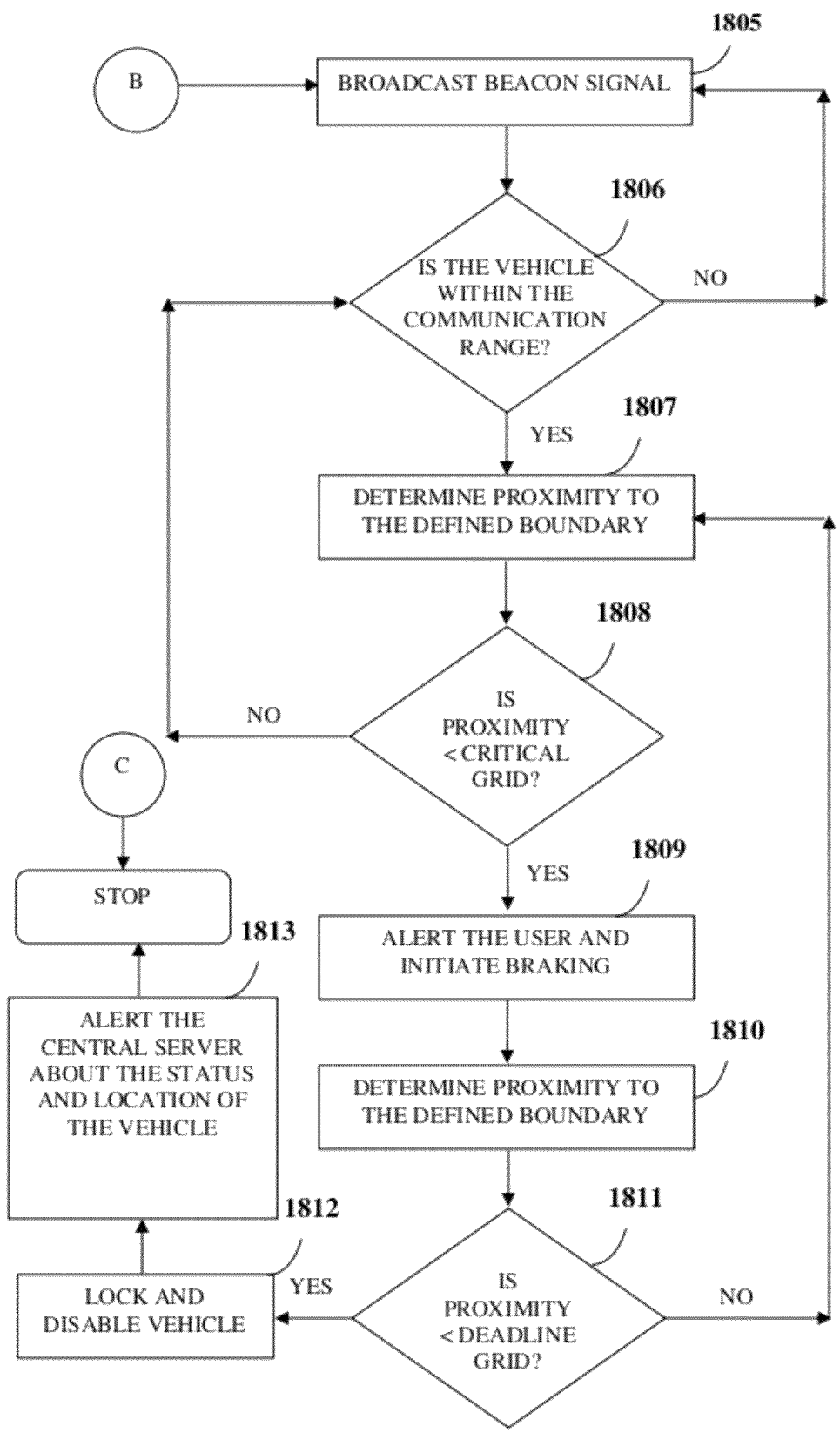

FIGS. 18A-18B exemplarily illustrate a flow chart comprising steps for determining a breach of a defined boundary 205 by an allocated vehicle 203a. At any time, the vehicles 203 are either parked and secured in one of the docking stations 202 or used by the users. The charging unit 509 at each of the docking stations 202 charges the parked and secured vehicles 203. For allocating a vehicle 203 to a user, the client component 503 checks 1801 if the vehicle 203 is parked in the docking station 202. When the vehicle 203 is parked in the docking station 202, the vehicle control unit 501 checks whether the client component 503 is requesting 1802 the vehicle 203 to return the charge level of the vehicle 203. If there is such a request from the client component 503, the vehicle control unit 501 sends 1803 the charge level of the vehicle 203 to the client component 503. The vehicle control unit 501 then returns 1804 to a low power mode or a sleep mode.

When the vehicle 203 is allocated to a user and unlocked for use in the managing area 206, the vehicle control unit 501 broadcasts 1805 a beacon signal at regular intervals. The vehicle control unit 501 checks 1806 whether the beacon signal is within the communication range 403 of one or more of the boundary units 201 by waiting for a response signal from the boundary units 201. If the allocated vehicle 203a is not within the communication range 403 of the boundary units 201, the allocated vehicle 203a continues to broadcast the beacon signal. When the allocated vehicle 203a is within the communication range 403 of the boundary units 201, the vehicle control unit 501, in communication with the boundary units 201, determines 1807 the proximity of the allocated vehicle 203a to the defined boundary 205.

The vehicle control unit 501 then checks 1808 whether the determined proximity is less than the distance between the critical grid 401 and the defined boundary 205. If the determined proximity is not less than the distance between the critical grid 401 and the defined boundary 205, the vehicle control unit 501 continues to check 1806 whether the allocated vehicle 203a is within the communication range 403 of the boundary units 201. If the determined proximity is less than the distance between the critical grid 401 and the defined boundary 205, the vehicle control unit 501 alerts 1809 the user and initiates 1809 braking of the allocated vehicle 203a to gradually reduce the speed of the allocated vehicle 203a, if the speed of the allocated vehicle 203a is more than the preset speed, for example, 5 kmph.

The vehicle control unit 501, in communication with the boundary units 201, then continues to determine 1810 the proximity of the allocated vehicle 203a to the defined boundary 205. The vehicle control unit 501 checks 1811 whether the determined proximity is less than the distance between the deadline grid 402 and the defined boundary 205. If the determined proximity is not less than the distance between the deadline grid 402 and the defined boundary 205, the vehicle control unit 501 continues to determine 1807 the proximity of the allocated vehicle 203a to the defined boundary 205. If the determined proximity is less than the deadline grid 402, the vehicle control unit 501 initiates locking and disabling 1812 of the allocated vehicle 203a. Moreover, the boundary units 201 send an alert 1813 to the central server 204 via the communication network 510 about the status and location of the allocated vehicle 203a.

Figure 19A:
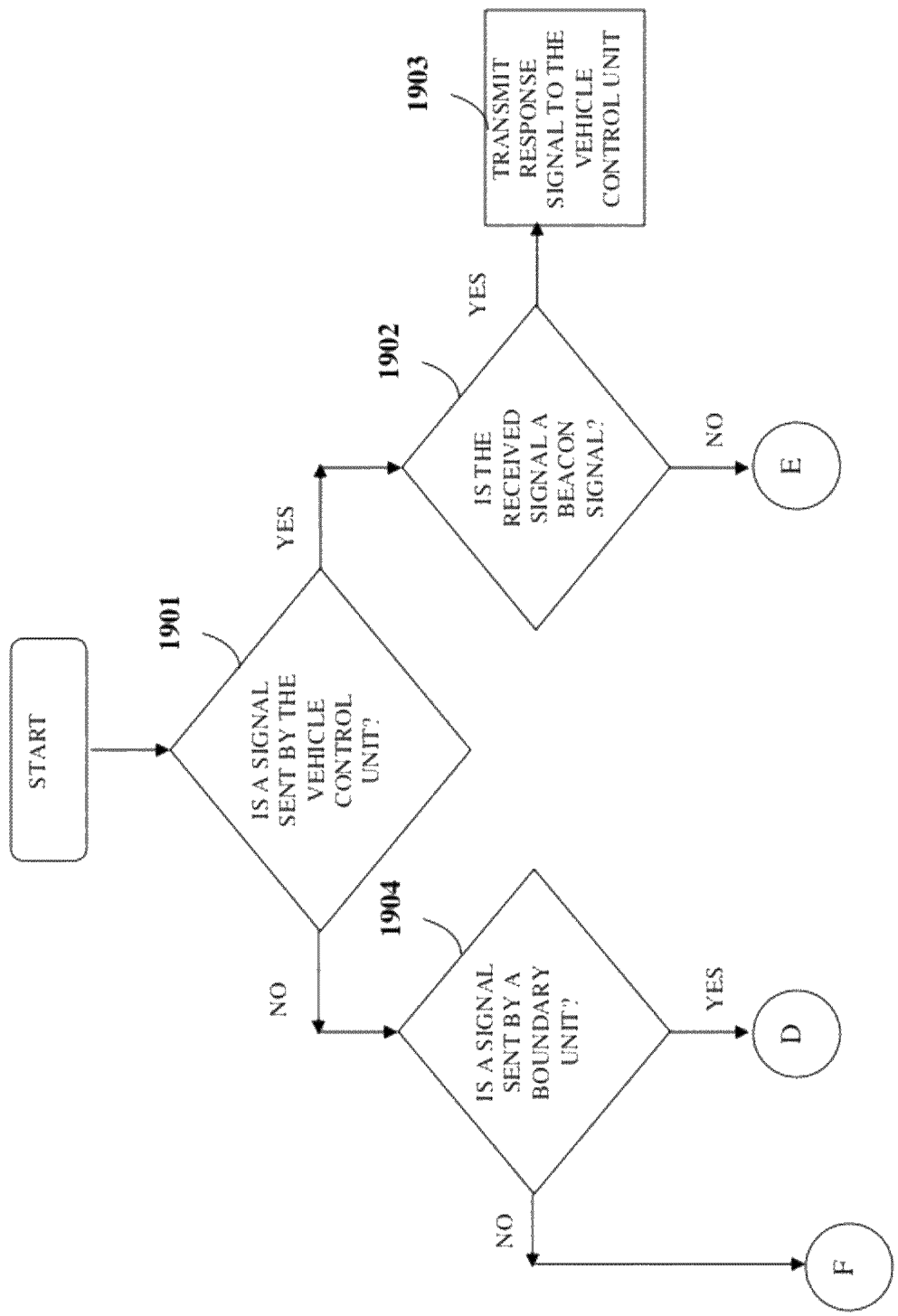
FIGS. 19A-19B exemplarily illustrate a flow chart showing communication between the boundary units.
Figure 19B:
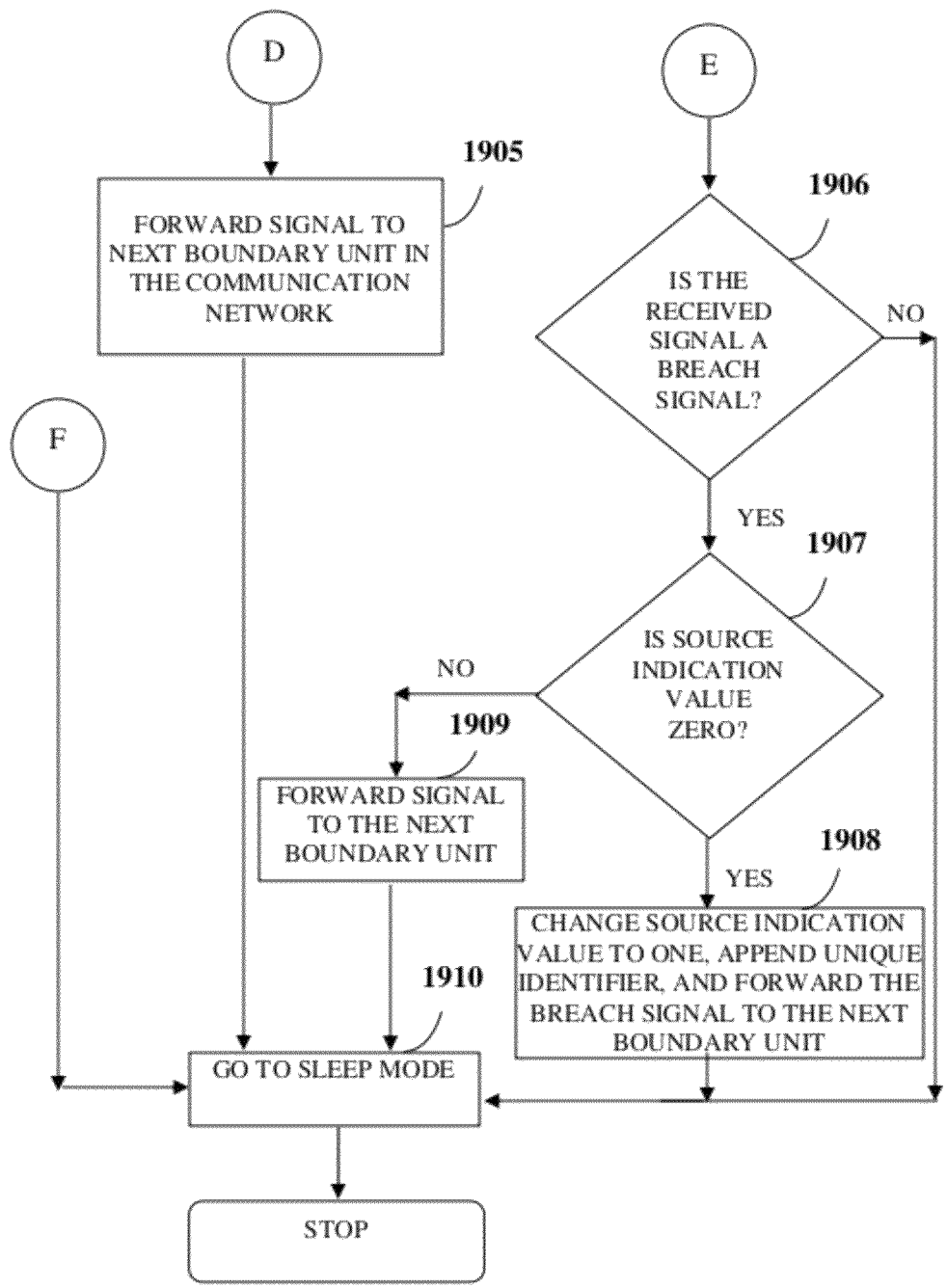

FIGS. 19A-19B exemplarily illustrate a flow chart showing communication between the boundary units 201. The boundary unit 201 receives signals from the vehicle control unit 501 of each of the allocated vehicles 203a and from the neighboring boundary units 201. The boundary unit 201 checks 1901 whether the received signal is a signal sent by the vehicle control unit 501 of an allocated vehicle 203a. If the received signal is from an allocated vehicle 203a, then the boundary unit 201 checks 1902 whether the received signal is a beacon signal. If the received signal is a beacon signal, the boundary unit 201 transmits 1903 a response signal back to the vehicle control unit 501 of the allocated vehicle 203a.

If the received signal is not sent by the vehicle control unit 501 of the allocated vehicle 203a, the boundary unit 201 checks 1904 whether the received signal is sent by one of the neighboring boundary units 201. If the received signal is not sent by one of the neighboring boundary units 201, the boundary unit 201 goes 1910 to a sleep mode. If the received signal is from one of the neighboring boundary units 201, the boundary unit 201 forwards 1905 the signal to the next boundary unit 201 in the communication network 510 and thereafter goes 1910 to a sleep mode.

If the received signal is sent by the vehicle control unit 501 of the allocated vehicle 203a and the received signal is not a beacon signal, the boundary unit 201 checks 1906 whether the received signal is a breach signal. The breach signal is sent by the vehicle control unit 501 after the allocated vehicle 203a is disabled. If the received signal is a breach signal, the boundary unit 201 checks 1907 the source indication value encoded in the breach signal. If the source indication value is zero, the boundary unit 201 changes 1908 the source indication value to one, appends 1908 its own unique ID, and forwards 1908 the breach signal to the next boundary unit 201 in the communication network 510 that leads to the central server 204. The boundary unit 201 then goes 1910 to a sleep mode. If the source indication value is not zero, the boundary unit 201 forwards 1909 the breach signal to the next boundary unit 201 in the communication network 510 without appending its unique ID. If the received signal is not a breach signal, the boundary unit 201 goes 1910 to a sleep mode. When the boundary unit 201 ceases to receive any signal, the boundary unit 201 returns 1910 to a low power state or the sleep mode.

Figure 20:
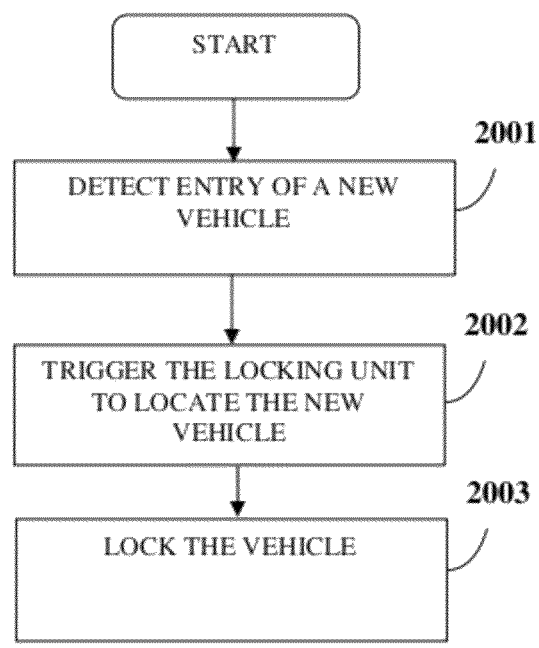
FIG. 20 exemplarily illustrates a flow chart comprising steps for securing a vehicle in a docking station.

FIG. 20 exemplarily illustrates a flow chart comprising steps for securing a vehicle 203 in a docking station 202. When a vehicle 203 is returned to the docking station 202, a user parks the vehicle 203 in one of the securing components 602 in the docking station 202 by inserting the protruding element 1001 on the vehicle 203 into the securing socket 602a of the securing component 602. The client component 503 detects 2001 the entry of a new vehicle 203. The client component 503 then triggers 2002 the locking unit 502 to locate the new vehicle 203. The locking unit 502 is then driven across the support structure 601 of the docking station 202 to locate the position of the new vehicle 203 by checking the status of each securing component 602 using the inductive proximity sensors 906b and 906c. The locking unit 502 locks 2003 the new vehicle 203 by engaging the inserted protruding element 1001 of the new vehicle 203 at the securing component 602.

Figure 21:
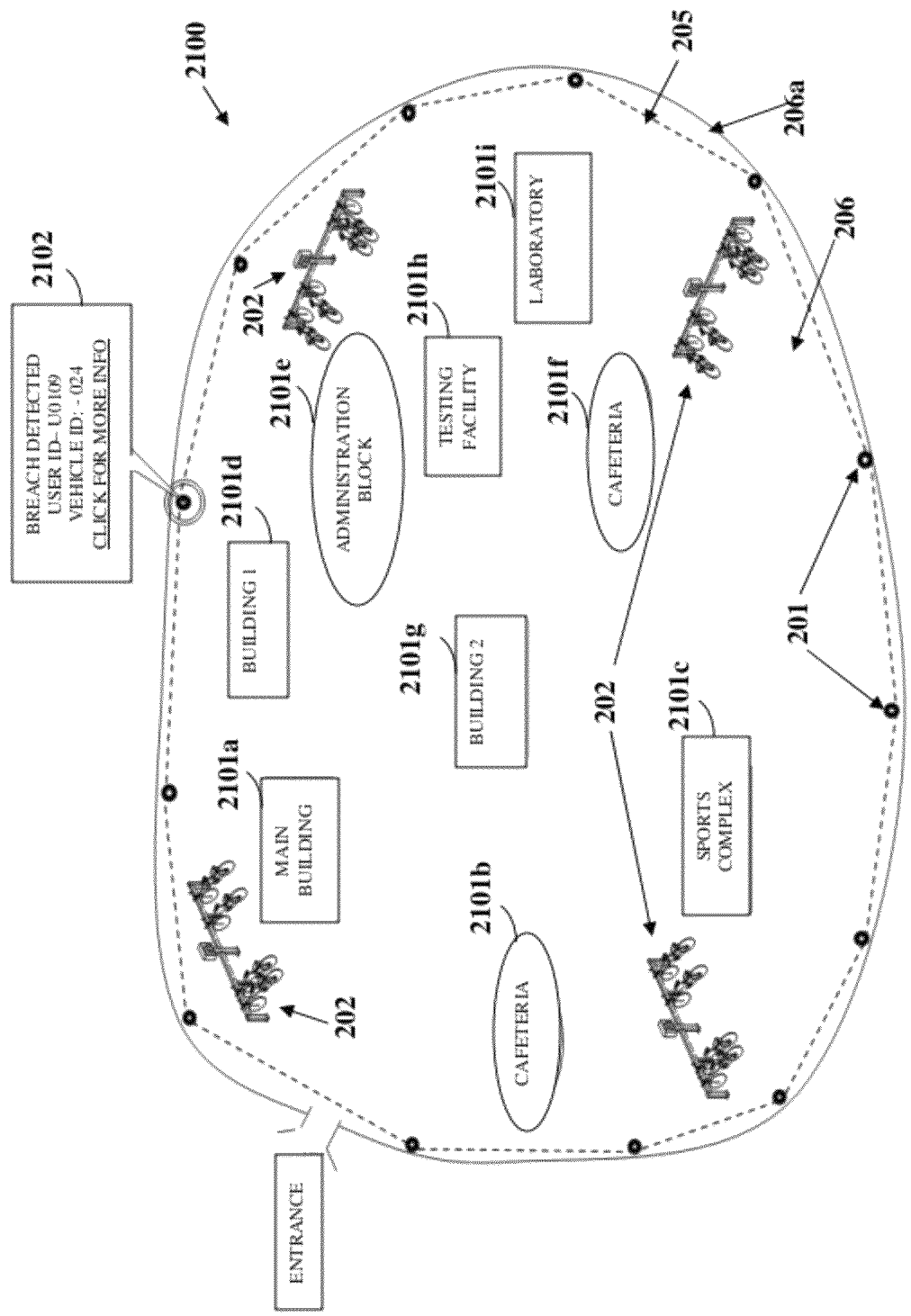
FIG. 21 exemplarily illustrates a map of a managing area displayed on a graphical user interface of the central server, when an allocated vehicle breaches the defined boundary.

FIG. 21 exemplarily illustrates a map 2100 of a managing area 206 displayed on a graphical user interface of the central server 204, when an allocated vehicle 203a breaches the defined boundary 205. The central server 204 stores a map 2100 of the managing area 206 in the database 204b of the central server 204. The central server 204 displays the map 2100 via the graphical user interface. The map 2100 shows the perimeter 206a of the managing area 206, the defined boundary 205, the boundary units 201, the docking stations 202, and the infrastructure in the managing area 206. The map 2100 also displays the location of the boundary unit 201 that is nearest to the allocated vehicle 203a that breaches the defined boundary 205. Consider an example, where the infrastructure 2101 in the managing area 206 comprises a main building 2101a, cafeterias 2101b and 2101f, a sports complex 2101c, a building 1 2101d, an administrator block 2101e, and a building 2 2101g, a testing facility 2101h, and a laboratory 2101i. The managing area 206 comprises four docking stations 202, that is, a docking station 202 near the main building 2101a, a docking station 202 near the sports complex 2101c, a docking station 202 near the cafeteria 2101f, and a docking station 202 near the administrator block 2101e.

When an allocated vehicle 203a breaches the defined boundary 205 and is therefore disabled, the central server 204, in communication with the boundary units 201, determines the location of the boundary unit 201 nearest to the allocated vehicle 203a. The central server 204 uses the location of the boundary unit 201 nearest to the allocated vehicle 203a as a reference to determine the location of the disabled vehicle 203b. The central server 204 alerts the system administrator by displaying an alert message 2102 on the map 2100. The alert message 2102 comprises, for example, the user identifier, the vehicle identifier, status of the allocated vehicle 203a, etc. The status of the allocated vehicle 203a is, for example, the speed of the allocated vehicle 203a, information on whether the allocated vehicle 203a has been disabled, etc. In an example, the map 2100 shows an alert message 2102 highlighting the boundary unit 201 near building 1 2101d, when an allocated vehicle 203a is disabled near the boundary unit 201 near building 1 2101d.

Consider an example where the vehicle management system 200 disclosed herein manages vehicles 203 within a campus. Multiple boundary units 201 positioned at regular intervals along the perimeter 206a of the managing area 206 define a boundary 205 for the campus. Multiple docking stations 202 are positioned at predetermined locations across the campus, for example, one near the car parking lot, a second near the cafeteria, a third near the building in the campus, and a fourth near the library. Each of the docking stations 202 park and secure multiple vehicles 203. The vehicles 203 parked in the docking station 202 are locked. The vehicles 203 are, for example, bicycles used for commute from one location in the campus to another. Users who wish to borrow the bicycles from the docking stations 202 register with the central server 204. The registration module 204a in the central server 204 requests for identification details, for example, name, age, and employee ID of the user and registers the user by providing a user identifier. The user identifier is, for example, a barcode coded on an identification (ID) card. The registration module 204a also issues a password to the user. The central server 204 stores the user identifier of each of the registered users in the database 204b.

A user, who needs to commute from the car parking lot to the library, can borrow a bicycle parked in the docking station 202 near the car parking lot. The client component 503 in the docking station 202 near the car parking lot, in communication with the central server 204, allocates a bicycle to the user. The client component 503 provides the communication interface 504 comprising an LCD screen that acts as an output device 504b, and a barcode reader, a button, and a keypad 504c that act as input devices 504a. The user presses a push button on the communication interface 504 to indicate that the user requires a bicycle. On receiving the input from the user, the LCD screen displays a message requesting the user to scan the user's ID card at the barcode reader. The barcode reader scans the barcode on the ID card. The LCD screen then displays a message requesting the user to enter the password. The user enters the password using the keypad 504c.

The authorization module 505 in the client component 503 sends the user's barcode and password in the form of data packets to the central server 204 for verification via the communication network 510. The central server 204 checks and cross verifies the received data against its database 204b, where a valid user's identification information is registered. After verification, the central server 204 sends back a message to the authorization module 505 of the client component 503 indicating whether the user's barcode and password is valid. If the user's barcode and password is invalid, the authorization module 505 displays an error message on the LCD screen. If the user's barcode and password is valid, the authorization module 505 displays a message on the LCD screen informing the user that the user is authorized to borrow a bicycle. The allocation module 506 in the client component 503 allocates a bicycle to the user based on allocation criteria. The allocation criteria for allocating one of the vehicles 203 from the docking station 202 comprise, for example, charge level of each of the parked and secured bicycles. The allocation module 506 then requests the bicycles parked in that docking station 202 to return their charge levels. The allocation module 506 allocates the bicycle with the highest charge level to the user.

The client component 503 then instructs the locking unit 502 to unlock the allocated vehicle 203a by passing its vehicle identifier to the locking unit 502. The locking unit 502 slides along the support structure 601 in the docking station 202 and scans the RFID tags mounted on the protruding element 1001 of each of the parked and secured vehicles 203 and locates the vehicle 203 whose RFID tag matches with the vehicle identifier that the client component 503 communicated to the locking unit 502. The locking unit 502 then unlocks the allocated vehicle 203a by disengaging the allocated vehicle 203a from the securing component 602. After the user retrieves the allocated vehicle 203a, the locking unit 502 notifies the successful allocation to the client component 503. The client component 503 then sends the user identifier and the vehicle identifier of the allocated vehicle 203a to the central server 204. The user can use the allocated bicycle to commute from the car parking lot to the library, and park the allocated bicycle near the docking station 202 near the library. The central server 204 logs the usage time of the allocated vehicle 203a and bills the user accordingly.

Consider another example, where the user intends to steal the allocated bicycle. The vehicle control unit 501 of the allocated vehicle 203a broadcasts a beacon signal at regular intervals. When the allocated vehicle 203a enters the communication range 403 of one or more boundary units 201, the RF transceivers 201b in the boundary units 201 receive the beacon signal. The vehicle control unit 501, in communication with the boundary unit 201, determines the proximity of the allocated vehicle 203a from the boundary units 201, using the proximity calculation algorithm. If the determined proximity of the allocated vehicle 203a is lesser than the distance between the critical grid 401 and the defined boundary 205, the speed monitoring and alerting module 501b in the vehicle control unit 501 makes a beep sound and plays an audio recording informing the user that the user has breached the critical grid 401. The speed monitoring and alerting module 501b checks the speed of the allocated vehicle 203a and activates the brake actuator 1402b of the disabling unit 1402 to gradually reduce the speed of the allocated vehicle 203a if the speed is more than a preset speed.

The proximity calculation algorithm is executed at regular intervals to determine the proximity of the allocated vehicle 203a to the defined boundary 205. When the determined proximity is less than the distance between the deadline grid 402 and the defined boundary 205, the speed monitoring and alerting module 501b notifies the user that the user has breached the defined boundary 205 of the campus. The disabling unit 1402 locks and disables the allocated vehicle 203a. Once disabled, the vehicle control unit 501 sends a breach signal that contains the vehicle identifier of the allocated vehicle 203a to the nearest boundary unit 201, that is, the first boundary unit 201 listed in the list. The first boundary unit 201 that receives the breach signal appends its own unique ID before forwarding the breach signal to the next boundary unit 201 in the communication network 510. The breach signal reaches the central server 204 via the communication network 510. The central server 204 updates the information regarding the breach comprising, for example, the user identifier, the vehicle identifier, etc., in the database 204b of the central server 204. The central server 204 also determines the location of the disabled vehicle 203b and displays an alert message 2102 in a map 2100 of the campus on the GUI of the central server 204 for alerting the system administrator.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes the main memory. Volatile media comprise, for example, a register memory, processor cache, a random access memory (RAM), etc. Transmission media comprise, for example, coaxial cables, copper wire and fiber optics, including the wires that constitute a system bus coupled to a processor. Common forms of computer readable media comprise, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device, and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Thus, embodiments are not limited to any specific combination of hardware and software. In general, the computer program codes comprising computer executable instructions may be implemented in any programming language. Some examples of languages that can be used comprise embedded C, C, C++, C#, Perl, Python, or JAVA. The computer program codes or software programs may be stored on or in one or more mediums as an object code. The computer program product disclosed herein comprises computer executable instructions embodied in a non-transitory computer readable storage medium, wherein the computer program product comprises computer program codes for implementing the processes of various embodiments.

Where databases are described such as the database 204b, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes, such as those disclosed herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method for managing a plurality of vehicles within a boundary, comprising:
   providing a vehicle management system comprising:
      a plurality of boundary units for creating a virtual boundary around a managing area, wherein said boundary units are adapted to receive beacon signals broadcasted from vehicle control units electromechanically connected to each of said vehicles, and wherein said boundary units are further adapted to respond to said vehicle control units when received signals are said beacon signals;
      a plurality of docking stations positioned at predetermined locations within said managing area for parking and securing said vehicles, wherein each of said docking stations comprises a client component and a locking unit, wherein said locking unit is adapted to be movable along the length of said docking station, and wherein said locking unit comprises sensors for automatically sensing, locking and unlocking said vehicles at each of said docking stations;
      said vehicle control units adapted for electronic communication with said boundary units and said client component in each of said docking stations; and
      a central server in electronic communication with said boundary units, said docking stations, and said vehicle control unit in a networked environment for monitoring and managing said boundary units, said docking stations, and said vehicle control unit;
   creating said virtual boundary around said managing area by placing said plurality of boundary units at predetermined locations along said managing area based on one or more of a communication range of radio frequency transceivers located within said boundary units, and number of corners in said managing area, wherein said docking stations are included within said virtual boundary;
   creating a critical grid and a deadline grid with reference to said virtual boundary within the communication range of each of said boundary units by using a proximity calculation algorithm, wherein said critical grid and said deadline grid are virtual grid lines within said virtual boundary of said managing area;
   creating said critical grid at a distance from said virtual boundary within which an allocated vehicle is adapted to be slowed down by said vehicle control unit;
   adapting said vehicle control unit to initiate braking of said allocated vehicle when said allocated vehicle crosses said critical grid;
   creating said deadline grid closer to said virtual boundary than said critical grid, wherein said allocated vehicle is adapted to be locked and disabled by said vehicle control unit before said allocated vehicle breaches said virtual boundary;
   adapting said vehicle control unit to initiate locking of said allocated vehicle when said allocated vehicle reaches said deadline grid, wherein sensors located in a disabling unit operably connected to a wheel of said vehicles are used by said vehicle control unit to control speed of said vehicles;
   adapting said client component to allocate one of said vehicles from one of said docking stations to a user based on an allocation criteria, wherein said client component is adapted to communicate with said central server to determine said allocation criteria;
   adapting said locking unit of said one of said docking stations to unlock said allocated one of said vehicles from said one of said docking stations;
   adapting said vehicle control unit to broadcast said beacon signal to enable determination of proximity of said allocated vehicle to said virtual boundary based on a response received from one or more of said boundary units, wherein said boundary units are adapted to check and respond to said vehicle control units on reception of said beacon signal, wherein said vehicle control unit is adapted to compute signal strengths of said received response signals by retrieving the received signal strength indicator (RSSI) values of said response signals, wherein said vehicle control unit is adapted to use said RSSI values to calculate a distance between said allocated vehicle and a responding boundary unit, and wherein RF transceivers and ceramic antennas are included in said vehicle control unit and said boundary units to precisely determine location of said allocated vehicle in crowded environments dominated by buildings and trees;
   managing movement of said allocated one of said vehicles within said virtual boundary, comprising one of:
      restricting movement of said allocated one of said vehicles within said virtual boundary by adapting said vehicle control unit to perform one of:
         reduce said speed of said vehicles below a preset low value by monitoring said speed of movement of said vehicles using said sensors in said disabling unit, and by activating a brake actuator in said disabling unit, when said allocated one of said vehicles crosses said critical grid; and
         bring said vehicles to a halt and lock said vehicles by using a lock actuator in said disabling unit, when said allocated one of said vehicles crosses said deadline grid; and
      adapting said locking unit of one of said docking stations to lock said allocated one of said vehicles, when said user parks said allocated one of said vehicles at one of said docking stations.

2. The method of claim 1, wherein said locking unit of each of said docking stations is slidably attached on a support structure in said each of said docking stations, wherein said locking unit contacts a securing component provided on said support structure for engaging and disengaging said allocated one of said vehicles from said one of said docking stations.

3. The method of claim 2, wherein said locking unit identifies and unlocks said allocated one of said vehicles secured at said one of said docking stations by sliding along said support structure, scanning vehicle identifiers of said vehicles secured at said one of said docking stations, and matching said vehicle identifiers with a vehicle identifier of said allocated one of said vehicles communicated to said locking unit by said client component.

4. The method of claim 2, wherein said locking unit, in communication with said securing component provided on said support structure, determines status of said vehicles at each of said docking stations based on arrival and said parking of said vehicles at said each of said docking stations and lock condition of said vehicles.

5. The method of claim 1, wherein said allocation criteria for allocating said one of said vehicles from said one of said docking stations comprise charge level of each of said vehicles parked and secured at said one of said dockings stations and user authorization.

6. The method of claim 1, wherein said vehicle control unit sends a warning signal to said user when said allocated one of said vehicles is in said close proximity to said virtual boundary.

7. The method of claim 1, further comprising providing a user identifier to said user by said central server on registration of said user with said central server, wherein said client component of said one of said docking stations in communication with said central server authorizes said user using said user identifier, and wherein said central server associates said user identifier with a vehicle identifier of said allocated one of said vehicles.

8. The method of claim 1, wherein said client component provides a communication interface for receiving identification information from said user for authorization of said user, in communication with said central server, for allocating said one of said vehicles to said user.

9. The method of claim 1, further comprising determining location of said allocated one of said vehicles by said central server in communication with said boundary units, when said allocated one of said vehicles is in said close proximity to said defined boundary and when said allocated one of said vehicles breaches said virtual boundary.

10. The method of claim 1, further comprising logging usage statistics of said allocated one of said vehicles by said central server in communication with each of said docking stations, said vehicle control unit, and said boundary units, wherein said central server generates billing information for said user based on said logged usage statistics.

11. A computer program product comprising computer executable instructions embodied in a non-transitory computer readable storage medium, wherein said computer program product comprises computer program code for:
receiving identification information of a user, a plurality of docking stations, a plurality of vehicles parked and secured at each of said docking stations, and a plurality of boundary units, and for registering said users, said docking stations, said vehicles, and said boundary units;
verifying said identification information received from said user for enabling allocation of one of said vehicles from one of said docking stations to said user;
creating a virtual boundary around a managing area using radio frequency communication between said boundary units, wherein number of said boundary units required to create said virtual boundary depends on one or more of a communication range of radio frequency transceivers in each of said boundary units and number of corners in said managing area, wherein said docking stations are included within said virtual boundary, wherein said boundary units are adapted to receive beacon signals broadcasted from vehicle control units electromechanically connected to each of said vehicles, and wherein said boundary units are further adapted to respond to said vehicle control units when received signals are said beacon signals;
creating a critical grid and a deadline grid with reference to said virtual boundary within the communication range of each of said boundary units by using a proximity calculation algorithm, wherein said critical grid and said deadline grid are virtual grid lines within said virtual boundary of said managing area;
creating said critical grid at a distance from said virtual boundary within which an allocated vehicle is adapted to be slowed down by said vehicle control unit;
adapting said vehicle control unit to initiate braking of said allocated vehicle when said allocated vehicle crosses said critical grid;
creating said deadline grid closer to said virtual boundary than said critical grid;
adapting said allocated vehicle to be locked and disabled by said vehicle control unit before said allocated vehicle breaches said virtual boundary;
adapting said vehicle control unit to initiate locking of said allocated vehicle when said allocated vehicle reaches said deadline grid, wherein sensors located in a disabling unit operably connected to a wheel of said vehicles are used by said vehicle control unit to control speed of said vehicles;
adapting said client component to allocate one of said vehicles from one of said docking stations to a user based on an allocation criteria, wherein said client component is adapted to communicate with said central server to determine said allocation criteria;
adapting said locking unit of said one of said docking stations to unlock said allocated one of said vehicles from said one of said docking stations;
adapting said vehicle control unit to broadcast said beacon signal to enable determination of proximity of said allocated vehicle to said virtual boundary based on a response received from one or more of said boundary units, wherein said boundary units are adapted to check and respond to said vehicle control units on reception of said beacon signal, wherein said vehicle control unit is adapted to compute signal strengths of said received response signals by retrieving the received signal strength indicator (RSSI) values of said response signals, wherein said vehicle control unit is adapted to use said RSSI values to calculate a distance between said allocated vehicle and a responding boundary unit, and wherein RF transceivers and ceramic antennas are included in said vehicle control unit and said boundary units to precisely determine location of said allocated vehicle in crowded environments dominated by buildings and trees;
managing movement of said allocated one of said vehicles within said virtual boundary, comprising one of:
restricting movement of said allocated one of said vehicles within said virtual boundary by adapting said vehicle control unit to perform one of:
reduce said speed of said vehicles below a preset low value by monitoring said speed of movement of said vehicles, when said allocated one of said vehicles crosses said critical grid; and
bring said vehicles to a halt and lock said vehicles, when said allocated one of said vehicles crosses said deadline grid; and
adapting said locking unit of one of said docking stations to lock said allocated one of said, when said user parks said allocated one of said vehicles at one of said docking stations;
logging usage statistics of said allocated one of said vehicles in communication with each of said docking stations, said vehicle control unit, and said boundary units; and
generating billing information for said user based on said logged usage statistics.

12. A method for managing a plurality of vehicles within a boundary, comprising:
providing a vehicle management system comprising:
a plurality of boundary units for creating a virtual boundary around a managing area, wherein said boundary units are adapted to receive beacon signals broadcasted from vehicle control units connected to each of said vehicles, and wherein said boundary units are further adapted to respond to said vehicle control units when received signals are said beacon signals;

a plurality of docking stations positioned at predetermined locations within said managing area for parking and securing said vehicles, wherein each of said docking stations comprises a client component and a locking unit;

said vehicle control units adapted for electronic communication with said boundary units and said client component in each of said docking stations; and a central server in electronic communication with said boundary units, said docking stations, and said vehicle control unit in a networked environment for monitoring and managing said boundary units, said docking stations, and said vehicle control unit;

creating said virtual boundary around said managing area by placing said plurality of boundary units at predetermined locations along said managing area based on one or more of a communication range of radio frequency transceivers located within said boundary units, and number of corners in said managing area, wherein said docking stations are included within said virtual boundary;

creating a critical grid and a deadline grid by said boundary units with reference to said virtual boundary within the communication range of each of said boundary units, wherein said critical grid and said deadline grid are virtual grid lines within said virtual boundary of said managing area;

creating said critical grid at a distance from said virtual boundary within which an allocated vehicle is adapted to be slowed down by said vehicle control unit;

adapting said vehicle control unit to initiate braking of said allocated vehicle when said allocated vehicle crosses said critical grid;

creating said deadline grid closer to said virtual boundary than said critical grid, wherein said allocated vehicle is adapted to be locked and disabled by said vehicle control unit before said allocated vehicle breaches said virtual boundary;

adapting said vehicle control unit to initiate locking of said allocated vehicle when said allocated vehicle crosses said deadline grid;

adapting said client component to allocate one of said vehicles from one of said docking stations to a user based on an allocation criteria, wherein said client component is adapted to communicate with said central server to determine said allocation criteria;

adapting said locking unit of said one of said docking stations to unlock said allocated one of said vehicles from said one of said docking stations;

adapting said vehicle control unit to broadcast said beacon to enable determination of proximity of said allocated vehicle to said virtual boundary based on a response received from one or more of said boundary units, wherein said boundary units are adapted to check and respond to said vehicle control units on reception of said beacon signal, wherein said vehicle control unit is adapted to compute signal strengths of said received response signals by retrieving the received signal strength indicator (RSSI) values of said response signals, wherein said vehicle control unit is adapted to use said RSSI values to calculate a distance between said allocated vehicle and a responding boundary unit;

managing movement of said allocated one of said vehicles within said virtual boundary, comprising one of:
  restricting movement of said allocated one of said vehicles within said virtual boundary by adapting said vehicle control unit to perform one of:
    reduce said speed of said vehicles below a preset low value by monitoring said speed of movement of said vehicles, when said allocated one of said vehicles crosses said critical grid; and
    bring said vehicles to a halt and lock said vehicles, when said allocated one of said vehicles crosses said deadline grid; and
  adapting said locking unit of one of said docking stations to lock said allocated one of said vehicles, when said user parks said allocated one of said vehicles at one of said docking stations.

* * * * *